United States Patent [19]
Gordon

[11] Patent Number: 6,138,609
[45] Date of Patent: *Oct. 31, 2000

[54] LITTER BOX

[75] Inventor: Tal Gordon, Hod Hasharon, Israel

[73] Assignee: Pets 'n People Ltd., Ramat Hasharon, Israel

[*] Notice: This patent is subject to a terminal disclaimer.

[21] Appl. No.: 09/329,527

[22] Filed: Jun. 10, 1999

Related U.S. Application Data

[63] Continuation of application No. 08/881,093, Jul. 9, 1997, Pat. No. 5,996,533.

[30] Foreign Application Priority Data

Jul. 10, 1996 [IL] Israel ........................................ 118829

[51] Int. Cl.$^7$ .................................................. A01K 29/00
[52] U.S. Cl. .......................................................... 119/166
[58] Field of Search .................... 119/161, 163, 119/165, 166, 168, 170

[56] References Cited

U.S. PATENT DOCUMENTS

| | | | |
|---|---|---|---|
| 3,734,057 | 5/1973 | Lee et al. | 119/166 |
| 3,822,673 | 7/1974 | Benny . | |
| 4,729,342 | 3/1988 | Loctin | 119/166 |
| 5,003,920 | 4/1991 | Miksitz | 119/163 |
| 5,966,533 | 12/1999 | Gordon | 119/166 |

*Primary Examiner*—Thomas Price
*Attorney, Agent, or Firm*—Darby & Darby

[57] ABSTRACT

A litter box including a housing for disposing therein litter for use by a pet, and a grinder for grinding excreta found in the litter box. The litter box preferably includes litter substantially impervious to grinding by the grinder. The litter box includes a filtering assembly for filtering the excreta, ground by the grinder, from the litter. The litter box preferably includes a cleansing liquid which is in fluid communication with the litter, Wherein the grinder agitates the litter and the cleansing liquid so as to cause cleansing of the litter.

18 Claims, 25 Drawing Sheets

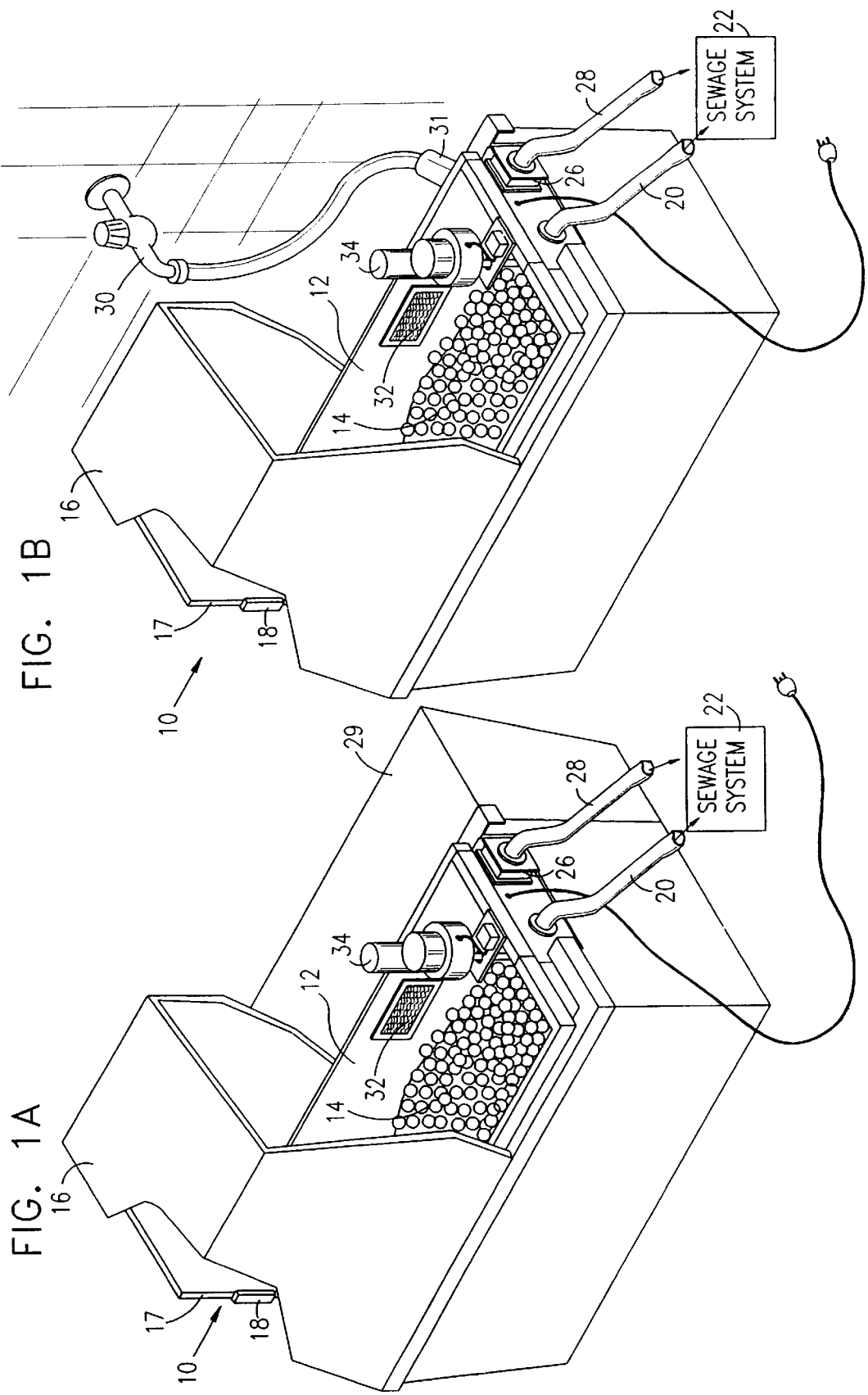

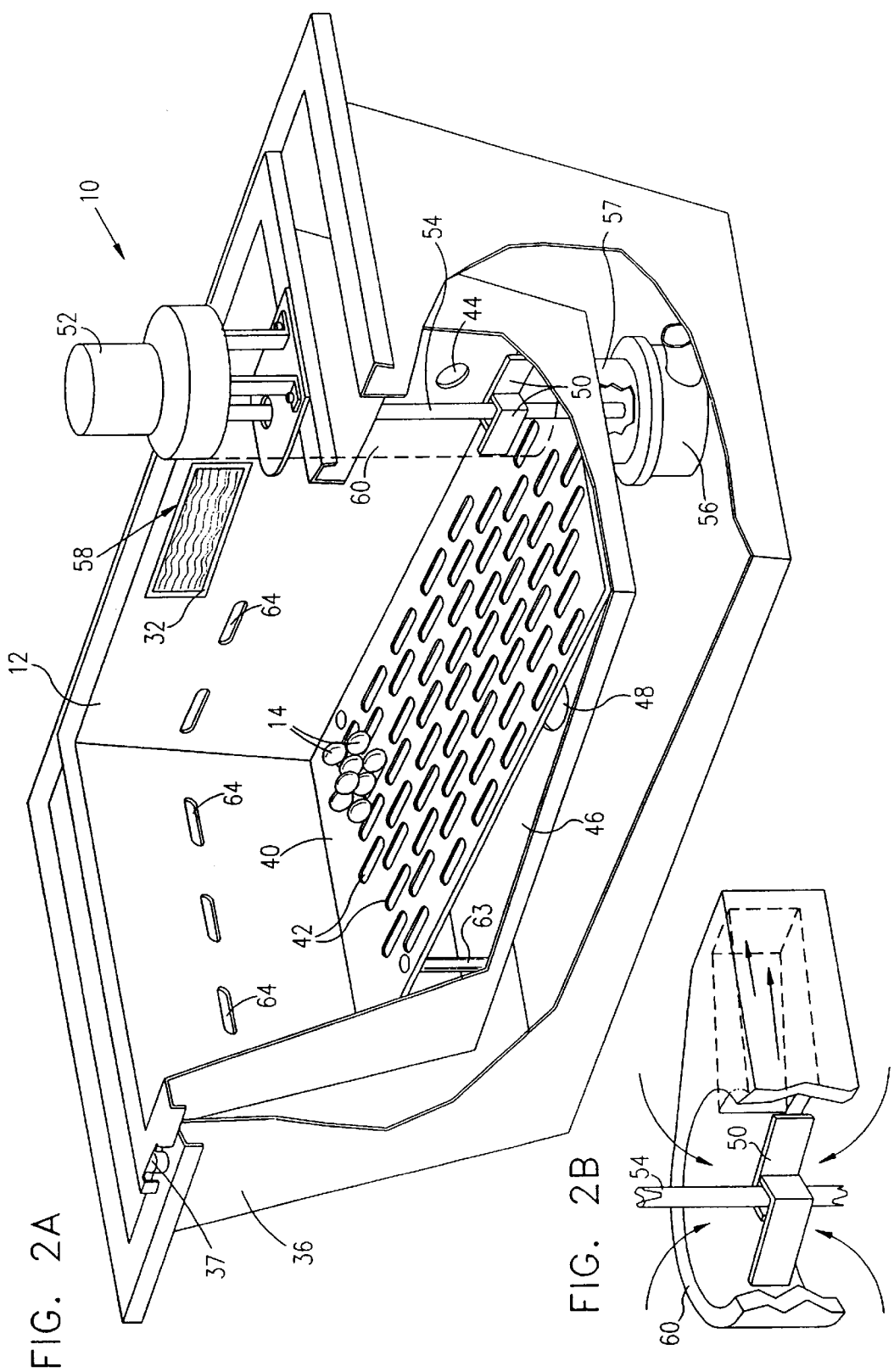

FIG. 36
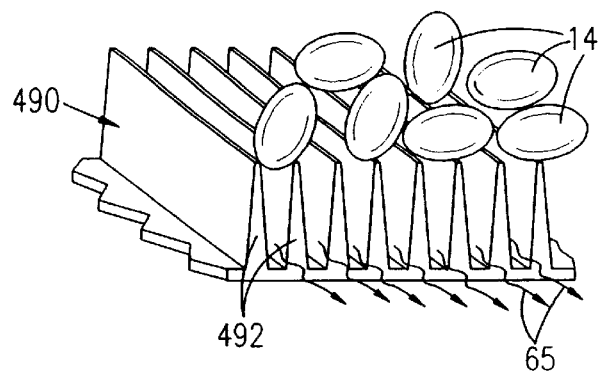
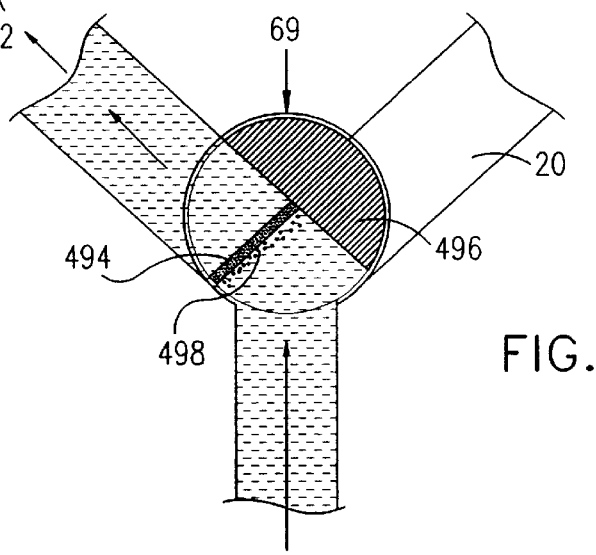
FIG. 37
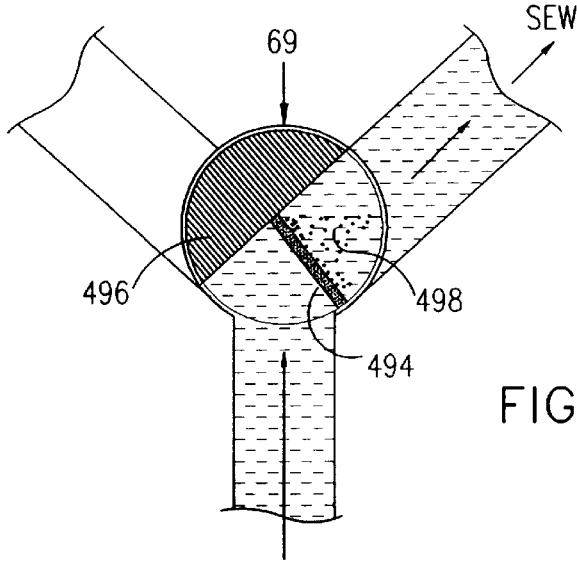
FIG. 38

LITTER BOX

This is a continuation, of application Ser. No. 08/881,093, filed Jul. 9, 1997, now U.S. Pat. No. 5,996,533. Each of these prior applications is hereby incorporated herein by reference, in its entirety.

FIELD OF THE INVENTION

The present invention relates generally to litter boxes for pets and particularly to a litter box for a pet which uses launderable litter and which frees a pet owner from having to dispose of litter and excrement.

BACKGROUND OF THE INVENTION

Many litter boxes are known, especially for domesticated cats who relieve themselves only inside the home of their owner. However, having a cat litter box in the home poses several problems. The odor of cat urine and excrement is particularly pungent and offensive. Many cat owners find the chore of cleaning the litter box inconvenient, time-consuming and repulsive. Handling cat excrement exposes the cat owner to potential health hazards. Furthermore, despite attempts by litter manufacturers to make cat litter which absorbs or masks odors and which is bacteriostactic, nevertheless the litter must still be replaced often to prevent potential growth of bacteria and other microorganisms.

Litter boxes for cats which attempt to reduce the aforementioned handling and odor problems are known. U.S. Pat. Nos. 2,204,416, 3,227,138, 3,734,057, 3,793,988, 3,965,863, 4,196,693, 4,574,735, 4,593,645, 4,729,342, 5,113,801 and 5,289,799 are believed to be representative of the art.

Of the aforementioned patents, only two, U.S. Pat. No. 4,593,645 to Dingler and U.S. Pat. No. 5,289,799 to Wilson, attempt to address the problem of bacterial growth on litter and disposal of litter. Dingler employs a reusable litter which is a relatively heavy, non-porous, non-absorbent type of gravel. The cat excreta and gravel are cleansed by a pressurized stream of water from a spray head which supposedly loosens dried fecal material from the gravel, and agitates the water containing the excreta so that the excreta remains dispersed in the water. After the water has risen to a predetermined level, the cat owner operates a lever to open a valve which rapidly discharges the water containing excreta to a sewer system. It is an essential part of the '645 patent that the gravel is significantly heavier than the excreta dispersed in the water so that the gravel remains at the bottom of the water and is not discharged along with the waste products.

The '645 patent has several disadvantages:

1. The spray of water does not conveniently reach all of the gravel, unless the user hand-sprays the entire litter box, including the bottom gravel. This is time-consuming and cumbersome.
2. Merely spraying the gravel with water does not ensure proper cleaning of the gravel, nor does it ensure that any fecal material clinging or adhering to the gravel will indeed be separated therefrom.
3. The separation of the waste water from the gravel is inefficient because gravel stirred with the water can exit the box together with the waste water and worse, unsuspended fecal material can remain with the gravel, thereby defeating the whole purpose of cleaning the gravel.

Wilson uses an endless belt which conveys soiled litter to a recycler which cleanses the litter. Afterwards, the litter is dried and conveyed to a dispenser for depositing the litter on a surface for reuse.

A disadvantage of the '799 patent, inter alia, is that the conveyor belt and recycler are relatively expensive and take up a lot of space. Furthermore, since the litter is not agitated during cleaning in the recycler, it is difficult to thoroughly cleanse the litter from fecal material clinging thereto.

SUMMARY OF THE INVENTION

The present invention seeks to provide an improved cat litter box which helps overcome the aforementioned problems of the prior art. The litter box of the present invention employs novel techniques and apparatus to thoroughly cleanse litter, preferably reusable, which is efficiently filtered from waste material, thereby leaving a bed of clean, substantially germ-free litter for further use by the cat. The litter box may be a "stand-alone" unit having a reservoir of water, or an "install-and-forget" unit connected to a domestic supply of water and sewage system, substantially freeing the cat owner from having anything to do with disposing cat excreta.

It is noted that throughout the specification and claims the term "filtering" refers to any method of separating waste material from litter, such as, but not limited to, filter materials, filter devices, flotation, precipitation, etc. Throughout the specification and claims the term "grinding" refers to any method of reducing a size of particles, such as, but not limited to, grinding, pulverizing, milling, disintegrating, rubbing, granulating, rasping, crushing, grating, trommeling (litter particles rubbing against each other), dashing, breaking, etc. Throughout the specification and claims the terms "pet" and "cat" are interchangeable and refer to any kind of pet.

The litter box employs an environmentally compatible and safe synthetic litter material, such as a plastic. The litter is placed on a tray which serves as a bedding or supportive surface for the litter. The tray has a plurality of holes sized so that the litter does not pass therethrough.

The cat owner may manually initiate cleansing of the litter or this may be accomplished automatically at predetermined intervals of time or automatically after the cat leaves the litter box. Water enters a compartment in which the bed of litter is located, and detergent is preferably added. The water floods the litter compartment and a rotating impeller then agitates the water, thereby creating a slurry which contains water, excreta and litter. The impeller continuously grinds and pulverizes the slurry matter, with the important exception of the litter which substantially remains unground due to its durable material properties and/or configuration wherein it is "hit" by the impeller but not ground.

During the grinding process, the litter remains above the tray, whereas the excreta is eventually ground to particles which have a diameter or width of substantially less than the elongated holes of the tray. The ground excreta and water are thus filtered from the litter by virtue of falling through the holes in the tray. The holes are preferably elongated such that hairs which fell from the cat or which passed together with the excreta can easily pass through the holes and be successfully filtered. In addition holes may be provided in the sides of the litter box through which hairs can pass. These holes can also serve as overflow draining holes.

After thoroughly grinding and filtering out all of the excreta from the slurry, the waste water which has filtered below the tray is then pumped to a sewage system. The remaining clean litter is now ready for further use by the cat. Optionally, a dryer and/or heater may be provided for drying the litter for immediate use if desired, since some cats may be averse to sitting on the litter while it is still damp.

The present invention includes other useful features for the safety of the cat and the hygiene and/or convenience of the cat owner. For example, an entrance door to the litter box may be provided with a safety lock mechanism for preventing inadvertent entry of the cat into the litter box during grinding of the slurry. An exhaust fan may be located in the litter box for drawing out foul odors from the litter box to the sewage system or elsewhere. The exhaust fan may be located at the bottom of the litter box, so that it additionally draws air through the litter so as to help dry the litter after cleansing. The impeller and pump may be assembled together on a single shaft of a drive motor and packaged as a single unit which may be easily installed in or removed from the litter box. Various valves, such as manual or electrical, may be employed to control the flow of water in and out of the litter box. A dispenser may be provided for measuring out optimal amounts of detergent.

There is thus provided in accordance with a preferred embodiment of the present invention a litter box including a housing for disposing therein litter for use by a pet, and a grinder for grinding excreta found in the litter box. The litter box preferably includes litter substantially impervious to grinding by the grinder.

In accordance with a preferred embodiment of the present invention the litter box includes a filtering assembly for filtering the excreta, ground by the grinder, from the litter. The filtering assembly may be self-cleaning.

Further in accordance with a preferred embodiment of the present invention the litter box includes a cleansing liquid which is in fluid communication with the litter, wherein the grinder agitates the litter and the cleansing liquid so as to cause cleansing of the litter. Preferably the grinder is located adjacent the litter. Alternatively the grinder is located remotely from the litter, and the litter box further includes a conveying apparatus for conveying the litter and the excreta to and from the grinder.

Still further in accordance with a preferred embodiment of the present invention the grinder includes an impeller and a motor connected to the impeller for causing rotation thereof, wherein the impeller when rotating causes grinding of the excreta.

Additionally in accordance with a preferred embodiment of the present invention the litter box includes a cleansing liquid which is in fluid communication with the litter, wherein the impeller when rotating imparts a motion to the excreta, the litter and the cleansing liquid, such that the excreta, the litter and the cleansing liquid flow along inner surfaces of the litter box.

In accordance with a preferred embodiment of the present invention the impeller is arranged for rotation in an impeller housings, the impeller housing being a centrifugal pump type of housing.

Further in accordance with a preferred embodiment of the present invention the litter box includes a cleansing liquid which is in fluid communication with the litter, wherein the grinder includes a drum and a motor connected to the drum for causing rotation thereof, wherein the drum when rotating agitates the excreta, the litter and the cleansing liquid, thereby causing the litter to be cleansed and the excreta to be ground.

Still further in accordance with a preferred embodiment of the present invention the grinder includes a vibrator, the vibrator causing grinding of the excreta by abrasive agitation thereof.

Additionally in accordance with a preferred embodiment of the present invention the grinder includes an ultrasonic device, the ultrasonic device causing grinding of the excreta by abrasive agitation thereof.

In accordance with a preferred embodiment of the present invention the filtering assembly has a plurality of holes formed thereon, such that the excreta when ground passes through the holes. Preferably the plurality of holes are elongated.

Further in accordance with a preferred embodiment of the present invention the filtering assembly includes a plurality of ridges spaced from one another a distance less than a smallest dimension of the litter so as to prevent the litter from passing through the ridges and to permit the excreta, when ground, to pass through the ridges.

Still further in accordance with a preferred embodiment of the present invention the filtering assembly is inclined towards the grinder so that the excreta being ground generally flows towards the grinder.

Additionally in accordance with a preferred embodiment of the present invention the litter box includes a pump for pumping waste material out of the litter box.

In accordance with a preferred embodiment of the present invention the pump recirculates the waste material such that the waste material undergoes at least one recirculation cycle of grinding by the grinder before being pumped out of the litter box.

Further in accordance with a preferred embodiment of the present invention the pump recirculates the waste material such that the waste material undergoes at least one recirculation cycle of filtering by the filtering, assembly before being pumped out of the litter box.

Still further in accordance with a preferred embodiment of the present invention the grinder and the pump are packaged as a single unit installable in and removable from the litter box.

There is also provided in accordance with a preferred embodiment of the present invention a pet door pivotally attached to a hinge such that the pet door swings generally about the hinge to become a doormat poor a pet to tread upon. The pet door may be particularly suitable for a door of a house.

There is also provided in accordance with a preferred embodiment of the present invention a door for a litter box, the door being pivotally attached to the litter box such that the door swings generally outwards to become a doormat for a pet to tread upon when exiting the litter box. Preferably the door includes a material on a surface thereof which substantially absorbs moisture from a paw of a pet.

In accordance with a preferred embodiment of the present invention the door includes a rim which substantially prevents matter from spilling outwards from the door when the door is open.

Further in accordance with a preferred embodiment of the present invention the cleansing liquid is supplied from domestic water supply apparatus.

Still further in accordance with a preferred embodiment of the present invention the litter box includes a liquid reservoir for supplying the cleansing liquid.

Additionally in accordance with a preferred embodiment of the present invention the litter box includes a dryer for drying the litter.

In accordance with a preferred embodiment of the present invention the litter box includes a safety lock mechanism for preventing inadvertent entry of a pet into the litter box during grinding of the excreta.

Further in accordance with a preferred embodiment of the present invention the litter box includes a detergent which cleanses the litter. Preferably the detergent is selected from the group consisting of a bacteriostactic detergent, a detergent which attacks protozoa, a detergent which attacks Toxoplasma spp., a detergent which chemically attacks excreta, a detergent which neutralizes odors, a deodorant, a solid detergent soluble in the cleansing liquid, a liquid detergent, a powder detergent, detergent cubes, detergent flakes, and a toilet-type deodorant/detergent.

Still further in accordance with a preferred embodiment of the present invention the litter box includes a dispenser for measuring out the detergent. The dispenser may include a toilet-type dispenser.

Preferably the litter includes an environmentally safe synthetic material

There is also provided in accordance with a preferred embodiment of the present invention an adaptor device connectable to a waste discharge pipe of a toilet bowl, the adaptor device including a top surface upon which a bottom surface of the toilet bowl rests, the top surface having a hole formed therein generally perpendicular thereto which passes through the adaptor device, wherein a discharge horn of the toilet bowl is in fluid communication with the hole and the hole is in fluid communication with a floor flange of the discharge pipe, and a transverse pipe in fluid communication with the hole, wherein waste matter may be passed through the transverse pipe and discharged into the discharge pipe via the hole.

Preferably the transverse pipe is in fluid communication with an inner volume of the toilet bowl such that an odorous fluid emanating from the volume may be passed through the transverse pipe and discharged into the discharge pipe via the hole.

In accordance with a preferred embodiment of the present invention the adaptor device includes an exhaust fan for driving the odorous fluid through the transverse pipe.

In accordance with a preferred embodiment of the present invention the litter box includes an exit pipe which includes a bend formed at an end thereof, the bend being hookable onto a toilet bowl.

Further in accordance with a preferred embodiment of the present invention the litter box includes a safety cap attached to the end of the exit pipe, the safety cap substantially sealing the end when the bend is not hooked onto the toilet bowl.

Still further in accordance with a preferred embodiment of the present invention the litter box includes an exit pipe which terminates in a bendable, resilient pipe which may be snaked into a toilet bowl to be in direct fluid communication with a discharge end of the toilet bowl.

Additionally in accordance with a preferred embodiment of the present invention the litter box includes an exit pipe which is attachable to a threaded coupling of a discharge pipe of a toilet bowl.

In accordance with a preferred embodiment of the present invention the litter box includes an exit pipe which is attachable to a discharge pipe of a washing machine.

Further in accordance with a preferred embodiment of the present invention the litter box includes an exhaust fan for expelling odors.

There is also provided in accordance with a preferred embodiment of the present invention for use with a litter box an exhaust fan attached to a sewage pipe for drawing odors into the sewage pipe.

There is also provided in accordance with a preferred embodiment of the present invention a litter box including an exhaust fan and an exhaust pipe attached to a sewage pipe for drawing odors into the sewage pipe.

There is also provided in accordance with a preferred embodiment of the present invention a method for removing excreta from litter located in a litter box including the steps of grinding the excreta, and removing the excreta by separating the excreta from the litter. Preferably the excreta is separated by floating the litter on top of the excreta with a fluid. Alternatively the excreta is separated by floating the excreta on top of the litter with a fluid.

In accordance with a preferred embodiment of the present invention the method includes adding a detergent during at least one of the grinding and the removing.

Further in accordance with a preferred embodiment of the present invention the method includes the step of flooding the litter and the excreta with a cleansing liquid, wherein the step of grinding also causes agitating of the litter and the cleansing liquid so as to cause cleansing of the litter.

Still further in accordance with a preferred embodiment of the present invention the method includes imparting a flow motion to the cleansing liquid and the litter, and causing the flow motion to grind the excreta.

Additionally in accordance with a preferred embodiment of the present invention the method includes imparting a flow motion to the cleansing liquid and the litter, and causing the flow motion to thoroughly cleanse inner surfaces of the litter box.

In accordance with a preferred embodiment of the present invention the dispenser substantially prevents leaking of the detergent from the dispenser before and after the detergent is dispensed into the litter box.

Further in accordance with a preferred embodiment of the present invention the dispenser is operative to dispense a predetermined portion of the detergent.

Still further in accordance with a preferred embodiment of the present invention the dispenser provides an identification indication that the dispenser is installed in the litter box.

Additionally in accordance with a preferred embodiment of the present invention the dispenser provides an indication that the dispenser is authorized for use.

In accordance with a preferred embodiment of the present invention the dispenser provides an indication of a level of the detergent in the dispenser.

There is also provided in accordance with a preferred embodiment for use with a litter box in which is disposed litter for use by a pet, a dispenser including a reservoir for containing therein a detergent and apparatus for dispensing the detergent from the reservoir into the litter box.

BRIEF DESCRIPTION OF THE DRAWINGS

The present invention will be understood and appreciated more fully from the following detailed description, taken in conjunction with the drawings in which:

FIGS. 1A and 1B are simplified, partially cutaway pictorial illustrations of a litter box, constructed and operative in accordance with a preferred embodiment of the present invention, with a reservoir of water and connected to domestic water supply apparatus, respectively;

FIG. 2A is a simplified, partially cutaway pictorial illustration of the litter box of FIGS. 1A and 1B;

FIG. 2B is a simplified illustration of a housing in the vicinity of an impeller of the litter box of FIG. 2A;

FIG. 36 is a simplified illustration of a filter tray with ridges, constructed and operative in accordance with a preferred embodiment of the present invention; and FIGS. 37 and 38 are simplified illustrations of a valve, constructed and operative in accordance with a preferred embodiment of the present invention, useful in self-cleaning a filter assembly of the present invention, wherein FIG. 37 illustrates the valve in a recirculating mode and FIG. 38 illustrates the valve in a sewage-expelling mode.

DETAILED DESCRIPTION OF A PREFERRED EMBODIMENT

Figure 1C:
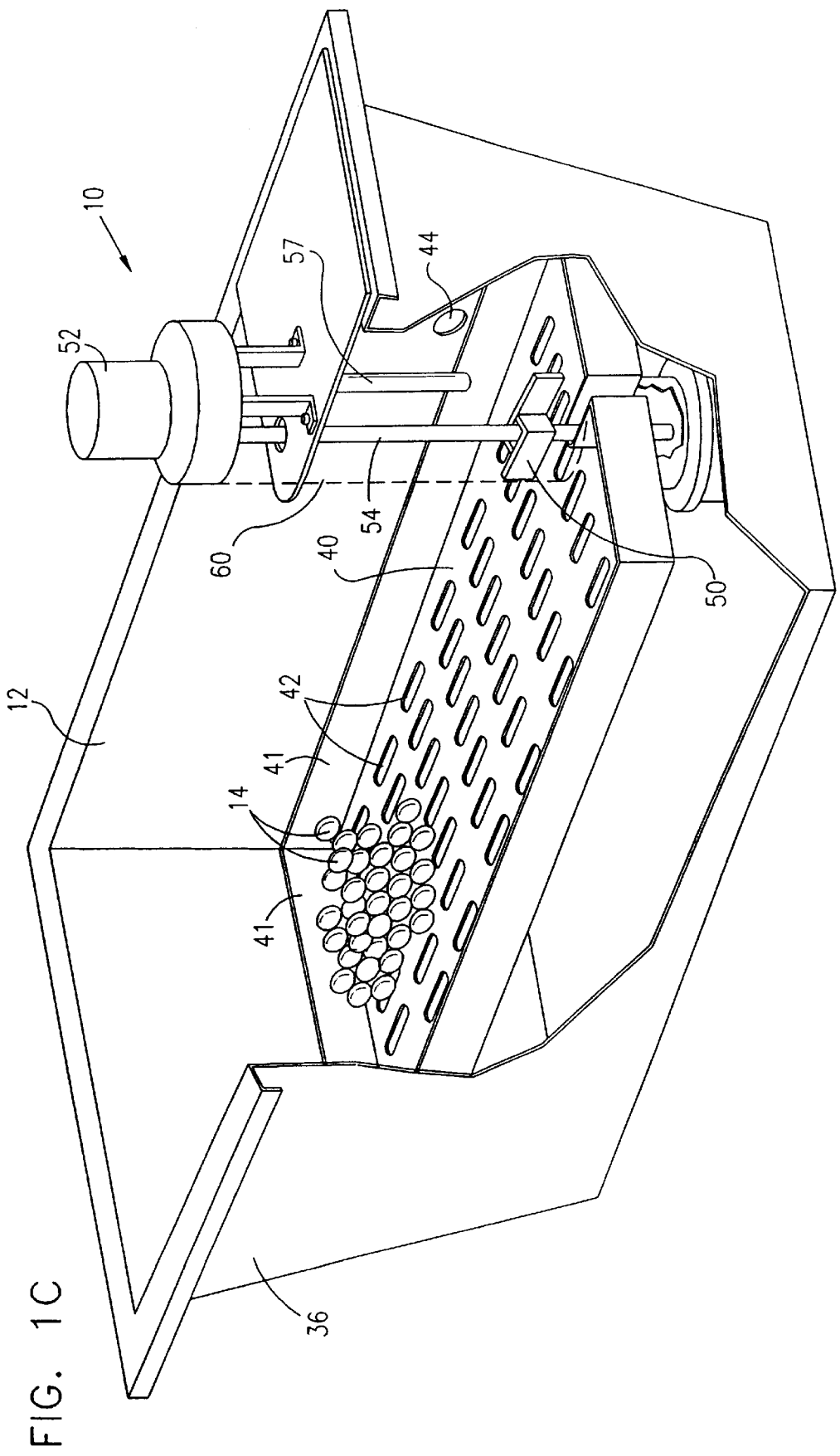
FIG. 1C is a simplified illustration of the litter box of FIG. 1B comprising a filter tray without an inner litter compartment.

Reference is now made to FIGS. 1A and 1B which illustrate a litter box 10, constructed and operative in accordance with a preferred embodiment of the present invention.

Litter box 10 preferably includes a litter compartment 12 into which may be placed litter 14. Litter 14 is preferably constructed of an environmentally compatible and safe synthetic material, such as a plastic, and may be of any arbitrary shape such as spherical. Litter 14 is preferably hydrophobic and may either float or sink in water.

Since cats naturally tend to scratch at and fling litter in an effort to bury therein excreta, litter box 10 preferably includes a hood 16 (shown partially cutaway in FIGS. 1A and 1B) which may be used to prevent litter from being strewn about by a cat. Hood 16 may include an entrance door 17 for a pet to enter litter box 10. Door 17 may be latchable to a safety lock mechanism 18, which substantially prevents inadvertent entry of the pet into litter box 10 during grinding of excreta, which grinding is described in detail hereinbelow. Door 17 may serve as a doormat for a cat exiting litter box 10, as is described in detail hereinbelow with reference to FIGS. 8–11. Alternatively, safety lock mechanism 18 may, comprise a sensor which prevents operation of the litter box if a pet is present therein.

Litter box 10 preferably includes an exit pipe 20 connected to a sewage system 22, such as a waste pipe of a house, for example. Litter box 10 may also include an exhaust fan 26 mounted only a side wall of litter box 10 for drawing out foul odors. Exhaust fan 26 preferably exhausts the foul odors towards sewage system 22, such as via a duct 28. Optionally, duct 28 and exit pipe 20 may be joined together. Exhaust fan 26 may be optionally located at the bottom of litter box 10 so that it additionally draws air through litter 14 so as to help dry litter 14 after cleansing. Exit pipe 20 and exhaust fan 26 may communicate with sewage system 22 in a variety of manners as is described further hereinbelow with reference to FIGS. 19–24.

In the embodiment shown in FIG. 1A, litter box 10 includes a liquid reservoir 29 for providing liquid, preferably water, for cleansing litter 14 and for filtering out excreta, as is described in detail hereinbelow. The litter box of FIG. 1A may be a "stand-alone" unit which may be particularly attractive for pet owners who do not wish to connect the litter box to the domestic plumbing system. In such a case, exit pipe 20, instead of being connected to sewage system 22, may be connected to a waste collection receptacle (not shown) supplied with the litter box. In the embodiment shown in FIG. 1B, water is provided by connection to domestic water supply apparatus 30. A valve 31, manual or electric, may be connected along an inlet from supply apparatus 30 for controlling flow of fluid therethrough. The litter box of FIG. 1B is thus an "install-and-forget" unit which substantially frees the cat owner from having anything to do with disposing cat excreta.

As is described in detail hereinbelow, litter box 10 is used to cleanse and launder litter 14 for further use by a cat. Optionally, a dryer 32 may be provided for drying litter 14 for immediate re-use if desired, since some cats may be averse to sitting on litter 14 while it is still damp. Dryer 32 may comprise a fan and/or heater for blowing hot or cold air to dry litter 14. The air may be introduced to litter 14 by positive or negative pressure. (As will be shown in FIG. 13, drying air can be introduced below litter 14.) The air may be drawn through layers of litter 14 by creating a positive or negative pressure gradient through litter 14. Other devices and methods for drying the litter 14 may be employed as well, such as vibrating or flinging the litter 14 so as to shake moisture thereoff.

During the cleansing process described hereinbelow, a detergent (not shown in FIGS. 1A and 1B) is preferably added to the cleansing liquid. The detergent may be specially prepared to help prevent health hazards, such as being bacteriostactic or capable of attacking or killing organisms, such as Toxoplasma spp. The detergent may comprise substances which chemically attack excreta, or which neutralize or mask odors. The detergent may be provided in a variety of forms, such as, but not limited to, a solid detergent soluble in the cleansing liquid, a liquid detergent, a powder detergent, detergent cubes, detergent flakes, or a toilet-bowl-type solid detergent. Preferably a dispenser 34 is provided for measuring out the detergent. Dispenser 34 may be any device suitable for dispensing a quantity of detergent, either predetermined or in accordance with such factors as cleansing liquid level, rate of liquid flow, for example. Various embodiments of dispenser 34 are described in detail hereinbelow with reference to FIGS. 25–33.

Reference is now made to FIG. 2A which is a partially cutaway pictorial illustration of the litter box of FIGS. 1A and 1B, with hood 16 removed for clarity. It is seen that litter compartment 12 is preferably fixedly seated in an outer compartment 36 by means of one or more locating pins 37.

Litter box 10 preferably includes filter apparatus, such as a filter tray 40 which has a plurality of elongated holes 42 formed thereon, such that excreta and hair may pass through holes 42. Filter tray 40 serves as a bedding or supportive surface for litter 14. For purposes of clarity, only a few particles of litter 14 are shown in FIG. 2A. Preferably litter 14 and elongated holes 42 are sized relative to each other such that litter 14 cannot fall through elongated holes 42. Litter 14 may have a width or diameter in the range of 1–10 mm, preferably 3–7 mm.

Litter compartment 12 preferably has an inlet port 44 located above or under filter tray 40 for introducing therethrough the cleansing liquid (not shown). Inlet port 44 may be in fluid communication either with reservoir 29 of the embodiment shown in FIG. 1A, or with domestic water apparatus 30 of the embodiment of FIG. 1B. A flooring, 46 is preferably provided below filter tray 40 with one or more ports 48 formed therein. Flooring 46 may be generally flat as shown in FIG. 2A, or it may be sloped towards port 48. Port 48 may be circular or have any other arbitrary shape. FIG. 1C illustrates an embodiment of litter box 10 without litter compartment 12, wherein filter tray 40 may accordingly span the entire length and width of litter box 10. Tray 40 (FIG. 1C) may include sides 41 and is preferably removable, with litter 14 therein, from litter box 10 without disturbing any other element of litter box 10. Otherwise the construction and operation of the embodiment of litter box 10 illustrated in FIG. 1C are preferably substantially identical to the embodiments illustrated in FIGS. 1A and 1B.

Litter box 10 includes a grinder which preferably includes an impeller 50, located inside litter box 10 for grinding excreta (not shown in FIG. 2A). Impeller 50 is preferably located inside litter compartment 12, although alternatively, as is described further below with reference to FIG. 12, it may be located adjacent and outside of litter compartment 12, in which case it is fluidly connected to litter compartment 12 by means of suitable ducting. motor 52, which is preferably located above litter compartment 12, is connected to impeller 50 preferably via a shaft 54. A pump 56 is preferably provided for pumping water, as will be described hereinbelow.

Preferably pump 56 is also assembled on shaft 54 of motor 52, such that motor 52, impeller 50 and pump 56 are packaged as a single unit 58, optionally provided with a housing 60, installable in and removable from litter box 10. Housing 60 preferably does not cover an area in the vicinity of matter towards impeller 50 so that excreta and waste fluid may flow freely towards impeller 50. Referring, to FIG. 2B, it is seen that housing 60 may optionally have a portion shaped like a centrifugal pump type of housing adjacent impeller 50, so that impeller 50 may centrifugally spew ground matter outwards of housing 60 and cause said ground matter and litter 14 to circulate inside of and flow along the sides of litter compartment 12 during grinding.

Pump 56 is preferably a centrifugal type of pump. An outer housing of pump 56 may be fixedly attached to litter compartment 12. Optionally, impeller 50 may serve a dual purpose and also serve as the pump 56. In such a case, impeller 50 may be mounted at a different location along shaft 54, if necessary.

Filter tray 40 may be inclined towards impeller 50, such as by means of one or more mounting posts 63 so that matter being ground generally flows towards impeller 50. One or more overflow openings 64 may be formed in side walls of litter compartment 12. Openings 64 may be useful in passing therethrough hairs and other debris during filtering, of excreta.

Figure 3:
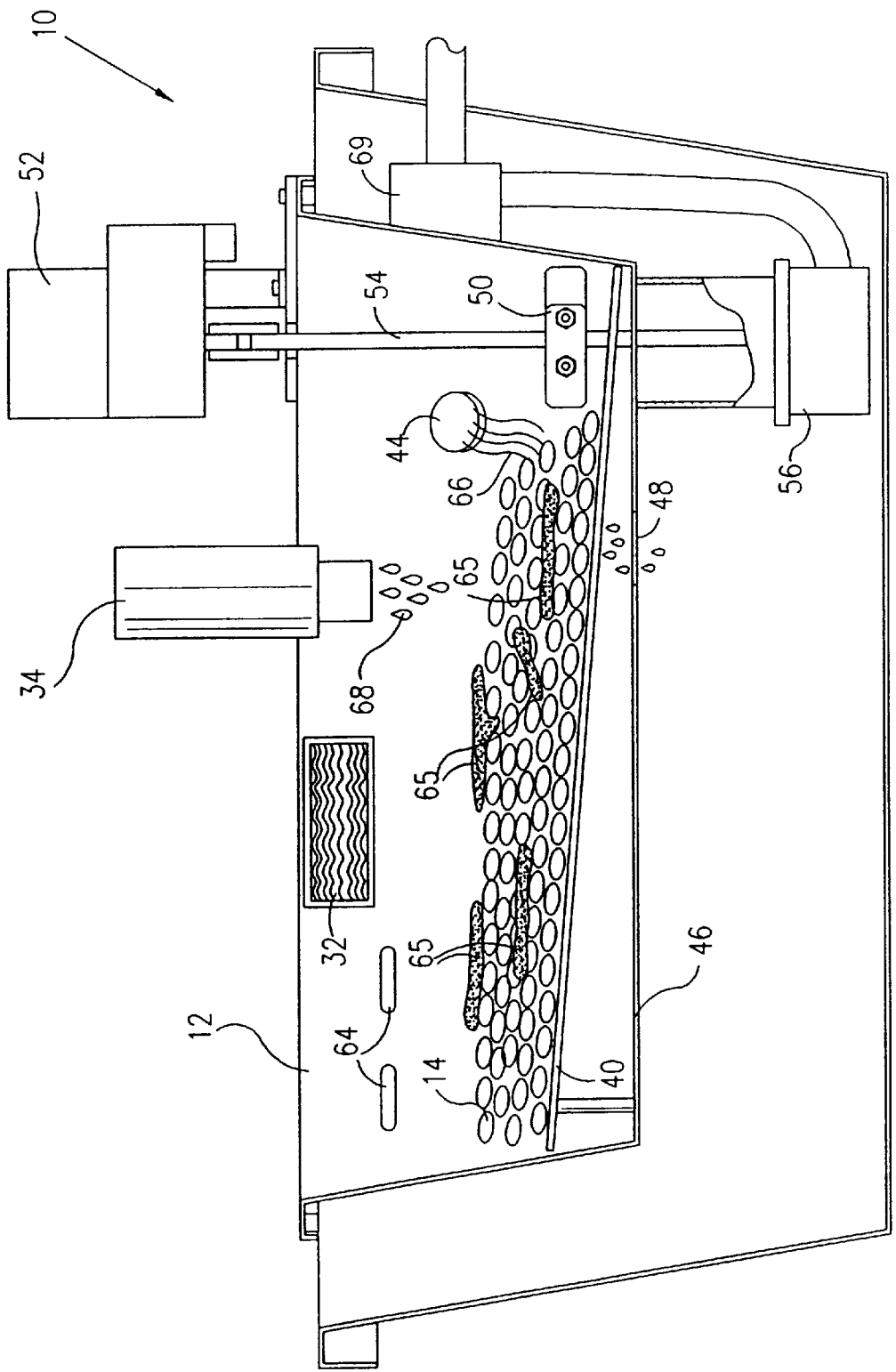
FIG. 3 is a simplified cutaway side view illustration of the litter box of FIG. 2A, wherein a cleansing liquid is introduced into a litter compartment in which is located excreta.

The operation of litter box 10 will now be described with reference to FIGS. 3–7. Reference is now made to FIG. 3 which is a simplified cutaway side view illustration of the litter box of FIG. 2A. A cat owner (not shown) may initiate cleansing of litter 14 and filtered removal of excreta 65 by manually causing a cleansing liquid 66, typically water, to flow into litter compartment 12 from reservoir 29 or domestic water supply apparatus 30, such as by operating suitable valves (not shown). A liquid level sensor 57 (shown in FIG. 1C) may be provided for sensing the level of cleansing liquid 66 and/or for sensing when litter compartment 12 has been adequately filled. Alternatively, liquid 66 may be automatically introduced into litter compartment 12 at predetermined intervals of time, such as two or three times a day, for example. In a further alternative arrangement liquid 66 may be automatically introduced into litter compartment 12 immediately after a pet has exited litter box 10. As litter compartment 12 is filled with liquid 66, a detergent 68 is preferably added, either manually or automatically, from dispenser 34. It is seen that a portion of liquid 66 drains through port 48, but port 48 is preferably sufficiently small in relation to the inflow of liquid 66, such that the majority of liquid 66 covers litter 14 and excreta 65.

Figure 4:
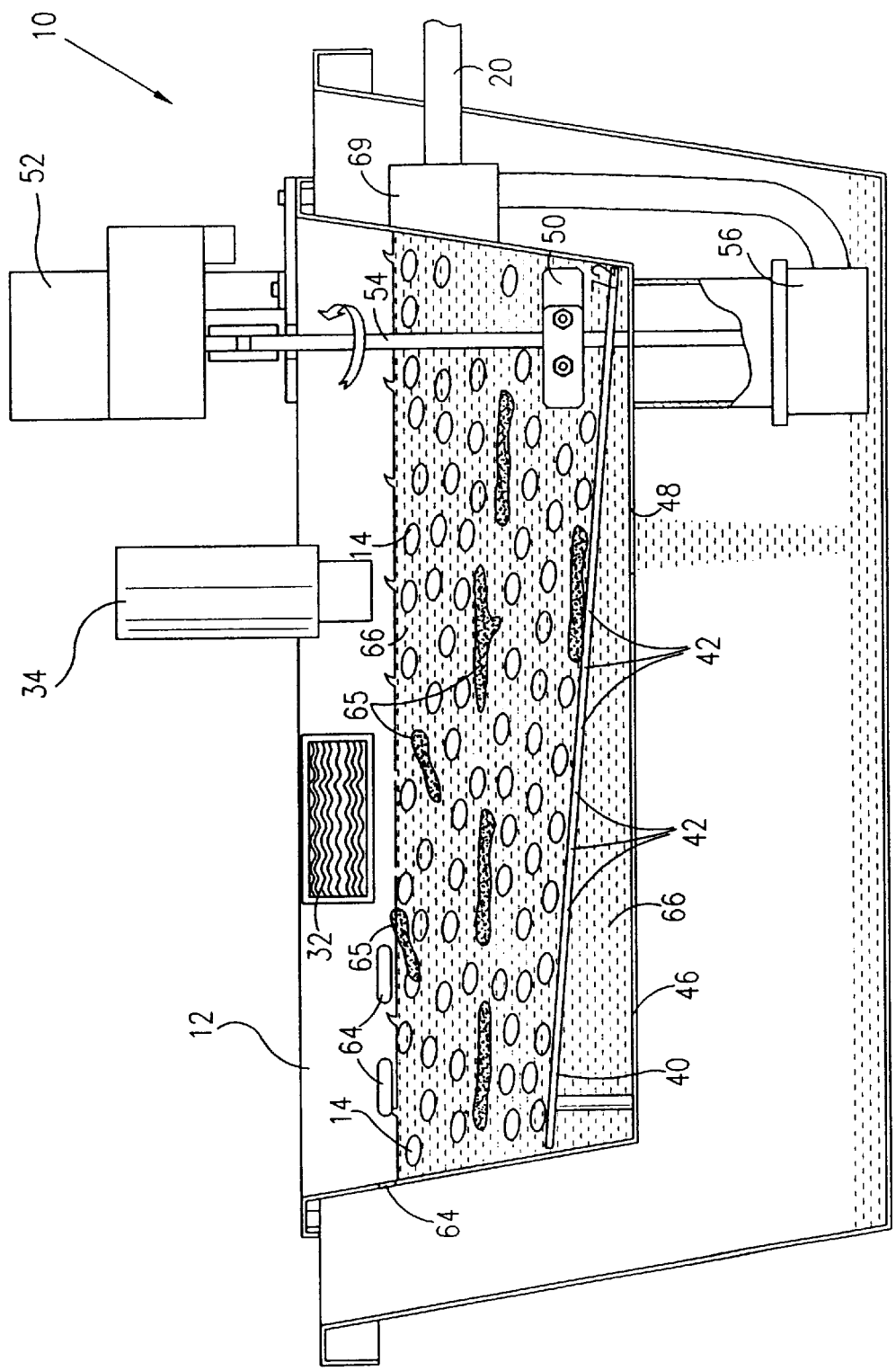
FIG. 4 is a simplified cutaway side view illustration of the litter box of FIG. 2A, wherein an impeller grinds the excreta found in the cleansing liquid.

Referring now to FIG. 4, it is seen that after litter compartment 12 is filled with liquid 66, motor 52 preferably commences to rotate impeller 50, thereby agitating liquid 66 and creating a slurry which contains liquid 66, excreta 65 and litter 14. As impeller 50 rotates, it centrifugally spews liquid 66, excreta 65 and litter 14, such that they circulate inside of and flow along the sides of litter compartment 12 during grinding. The flow motion together with the litter granules help to grind excreta 65 and to thoroughly cleanse the inner surfaces of litter box 10.

It is appreciated that operation of motor 52 may be initiated manually. Alternatively, motor 52 may be activated automatically such as by means of sensor 57 which senses the filling of litter compartment 12. The entire operation of litter box 10 is preferably accomplished automatically, such as by a control system (not shown) which may employ such sensors, and which may, inter alia, control and limit the level of liquid 66 which enters litter box 10, and detect and/or signal the presence of a pet in litter box 10. Such a control system is preferably entirely conventional and well known to persons skilled in the art and is therefore not described in detail.

Figure 5:
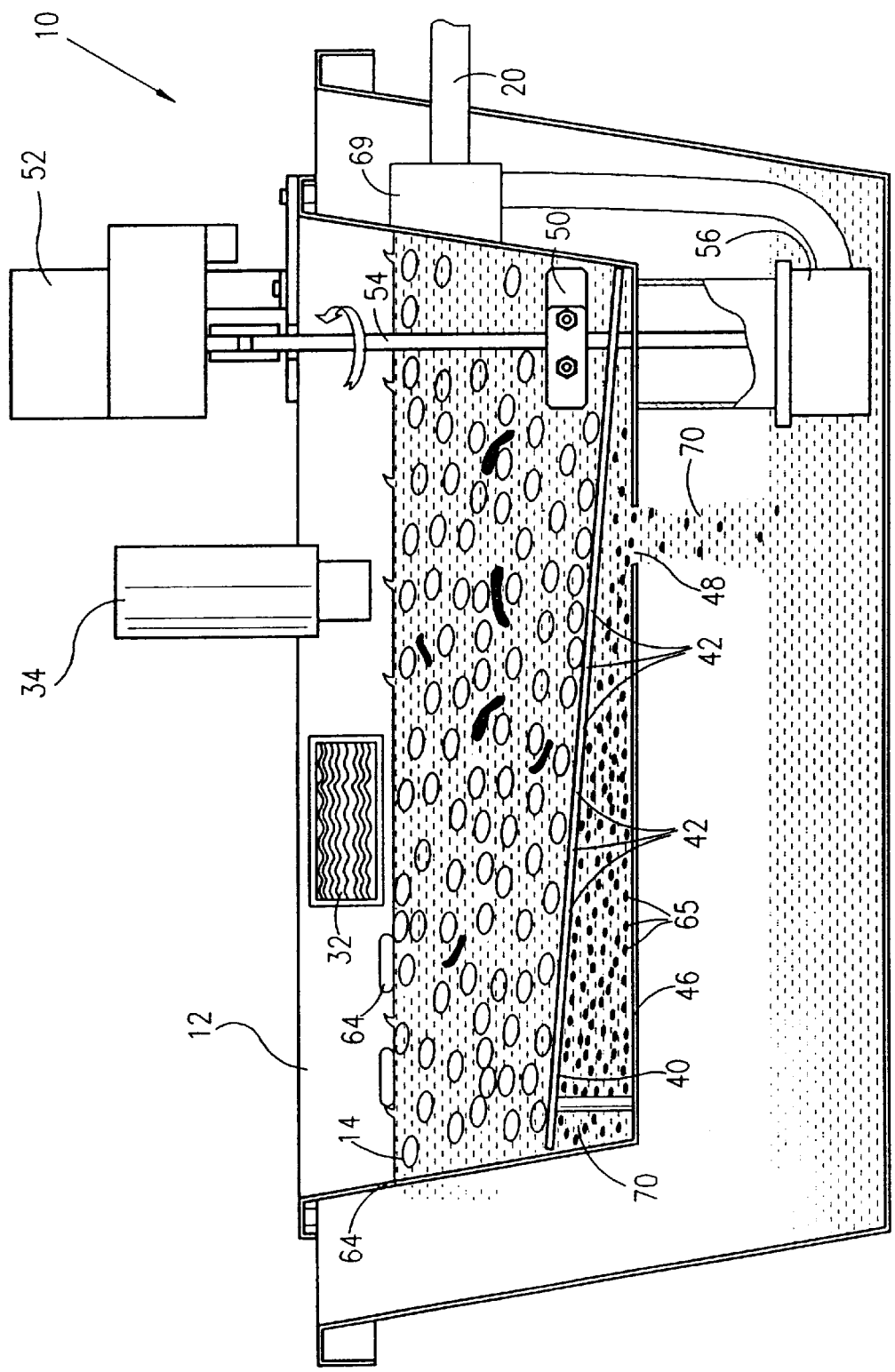
FIG. 5 is a simplified cutaway side view illustration of the litter box of FIG. 2A, wherein ground excreta is filtered through a filter tray and litter remains above the filter tray.

Referring now to FIG. 5, it is seen that impeller 50 continuously grinds and pulverizes excreta 65, whereas litter 14 is deflected off impeller 50 and substantially remains unground due to its durable material properties and/or size and shape. During the grinding process, litter 14 remains above filter tray 40, whereas excreta 65 is eventually ground to particles which are sufficiently small to fall through elongated holes 42 in filter tray 40. Since holes 42 are elongated, any hair which fell from the cat or which passed together with excreta 65 can easily pass through holes 42 or openings 64 and be successfully filtered. During the grinding process shown in FIG. 5, waste material 70 may be recirculated, which will be described with reference to FIG. 6.

After excreta 65 has been filtered through holes 42, waste material 70, containing ground excreta 65 suspended in liquid 66, flows to flooring 46 and exits through port 48. Waste material 70 may now be pumped by pump 56 to sewage system 22 via exit pipe 20 (FIGS. 1A and 1B).

Figure 6:
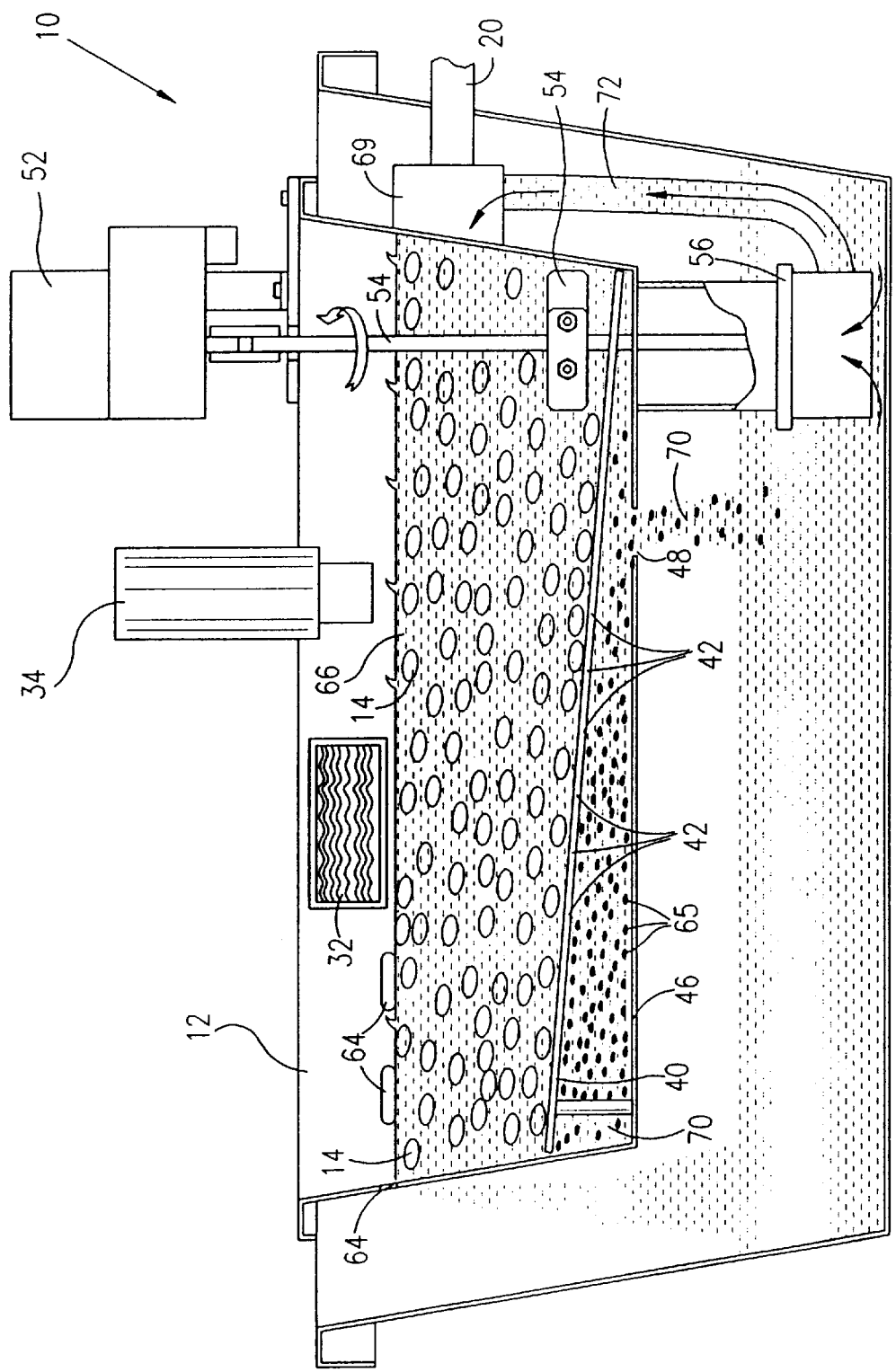
FIG. 6 is a simplified cutaway side view illustration of the litter box of FIG. 2A, wherein liquid is recycled through the process of grinding and filtering.

Before waste material 70 is discharged to sewage system 22, litter box 10 may be operated in a mode wherein waste material 70 is recycled for further laundering. Referring now to FIG. 6, it is seen that during the grinding pump 56 may be used to recirculate waste material 70 above filter tray 40, such as via a conduit 72, such that waste material 70 undergoes a predetermined number of cycles of grinding by impeller 50 and filtering by filter tray 40 before being pumped out of litter box 10 through exit pipe 20 (FIGS. 1A and 1B). The option of recycling waste material 70 for further grinding and filtering may be particularly useful for the stand-alone unit of FIG. 1A, such as for conserving the amount of cleansing liquid 66 stored in reservoir 29. Preferably a valve 69, such as an electrically operated valve, controls operation of pump 56 and inter alia, directs pumping through the recirculation route, i.e., via conduit 72, or through the exhaust route, i.e., via exit pipe 20 (FIGS. 1A and 1B).

Reference is now made to FIG. 37 which illustrates valve 69 in a recirculating mode. Valve 69 preferably includes a filter screen 494 and a blocking element 496. In FIG. 37, blocking element 496 blocks access to exit pipe 20 and liquid matter can flow through filter screen 494 back to litter compartment 12. Debris 498 is filtered by filter screen 494.

In FIG. 38, valve 69 is rotated so that blocking element 496 blocks flow to litter compartment 12 and waste materials can flow through filter screen 494. As the waste materials flow through filter screen 494, they carry away debris 498 which is now positioned on the side of filter screen 494 facing exit pipe 20. Thus, in FIG. 38, valve 69 operates in a sewage-expelling mode.

Figure 7:
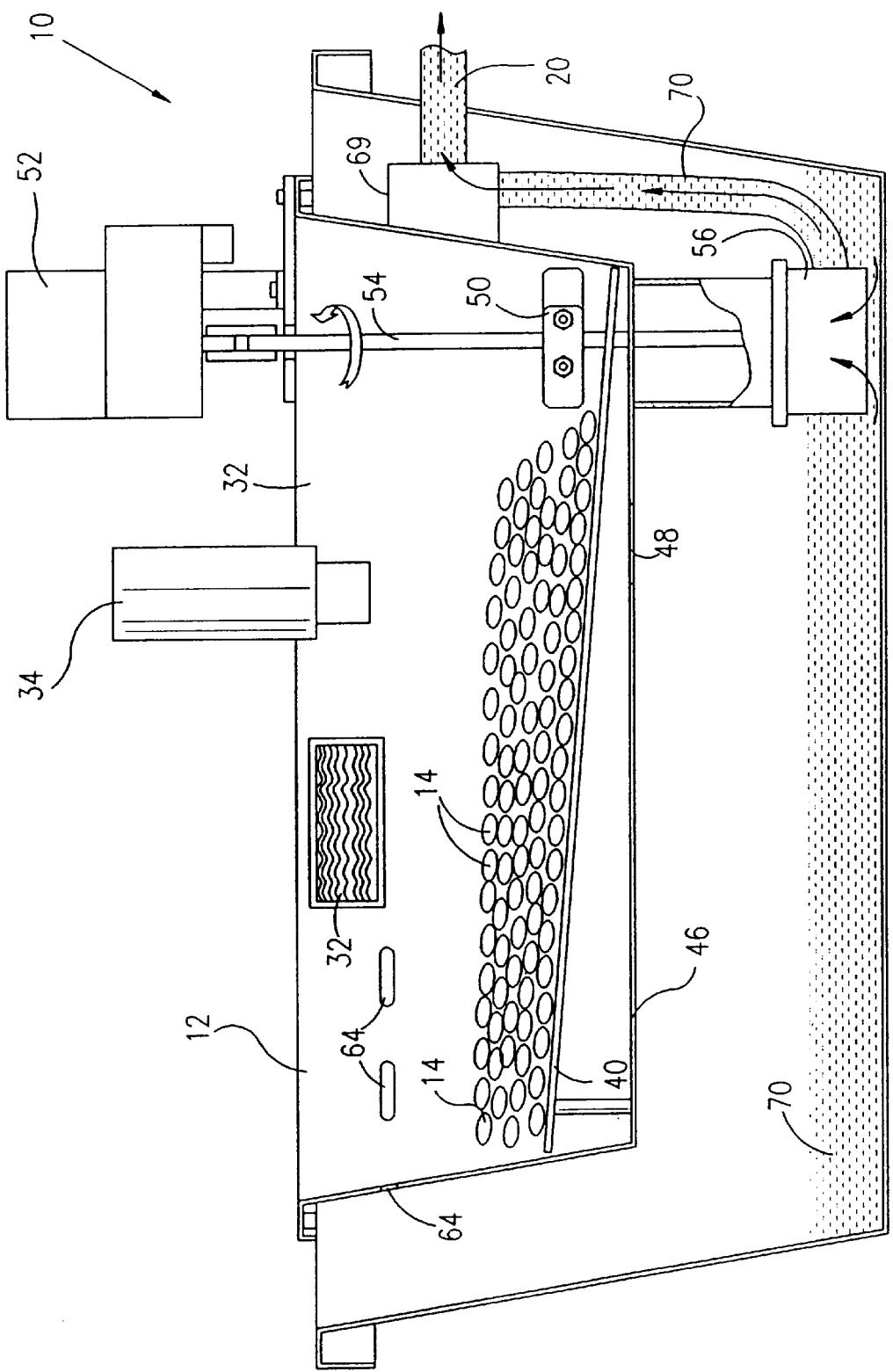
FIG. 7 is a simplified cutaway side view illustration of the litter box of FIG. 2A, wherein the ground excreta is pumped out of the litter box.
Figure 8:
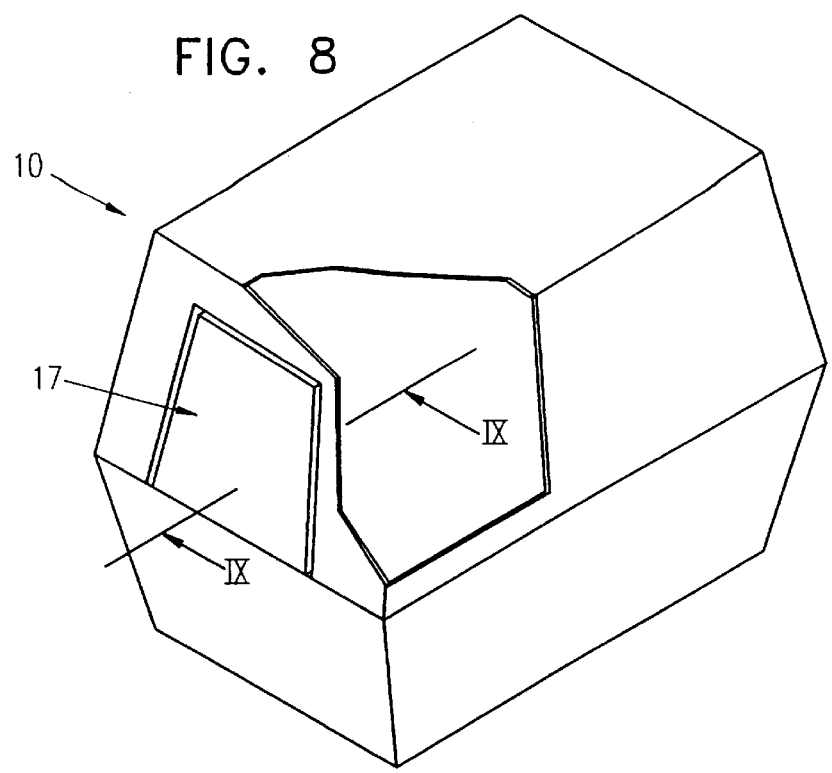
FIG. 8 is a simplified pictorial illustration of the litter box of FIG. 2A with a door, constructed and operative in accordance with a preferred embodiment of the present invention, the door being in a closed position.

Referring now to FIG. 7, it is seen that after thoroughly grinding and filtering out all of excreta 65, waste material 70 is discharged from litter box 10 and pumped to sewage system 22 (FIGS. 1A and 1B). The remaining clean litter 14 has been thoroughly laundered by the agitating action of impeller 50 and the cleansing and disinfecting properties of detergent 68 (FIG. 3), and is now ready for further use by a cat. Thus, litter 14 has been safely prepared for reuse without any need for messy and repulsive work on the part of a pet owner.

As mentioned above, dryer 32 may be used to dry litter 14 for re-use if desired, since some cats may be averse to sitting on litter 14 while it is still damp. It is appreciated that dryer 32 may be any type of conventional fan and/or heater and may be located with respect to litter 14 in a variety of alternate manners for efficient drying of litter 14, such as by blowing or sucking hot or cold air over or through litter 14.

It is noted that the grinding, filtering and cleansing processes of litter box 10 described hereinabove preferably includes three modes of operation:

a. Internal grinding by impeller 50.

b. Upper circulation of the slurry of excreta 65 and liquid 66 which wipes the sides of litter compartment 12.

c. Separation of excreta 65 from litter 14 by filtering through filter tray 40.

Optionally, the processes include disposing of floating hair and other waste matter through overflow openings 64. The embodiment of FIG. 1C does not require recirculation.

It is noted that other methods of filtering excreta 65, instead of filter tray 40, may be used. Reference is now made to FIG. 36 which illustrates a filter tray 490 which may be placed at the bottom of litter box 10 (not shown in FIG. 36). Filter tray 490 comprises a plurality of ridges 492 spaced from one another a distance less than a smallest dimension of litter 14 so as to prevent litter 14 from passing through ridges 492 and to permit the excreta 65, when ground, to pass through ridges 492.

It is further noted that litter compartment 12 may be filled or partially filled with liquid 66 with no further inflow of liquid 66 during the grinding process. Alternatively, liquid 66 may constantly flow into litter compartment 12 during the grinding process.

Figure 9:
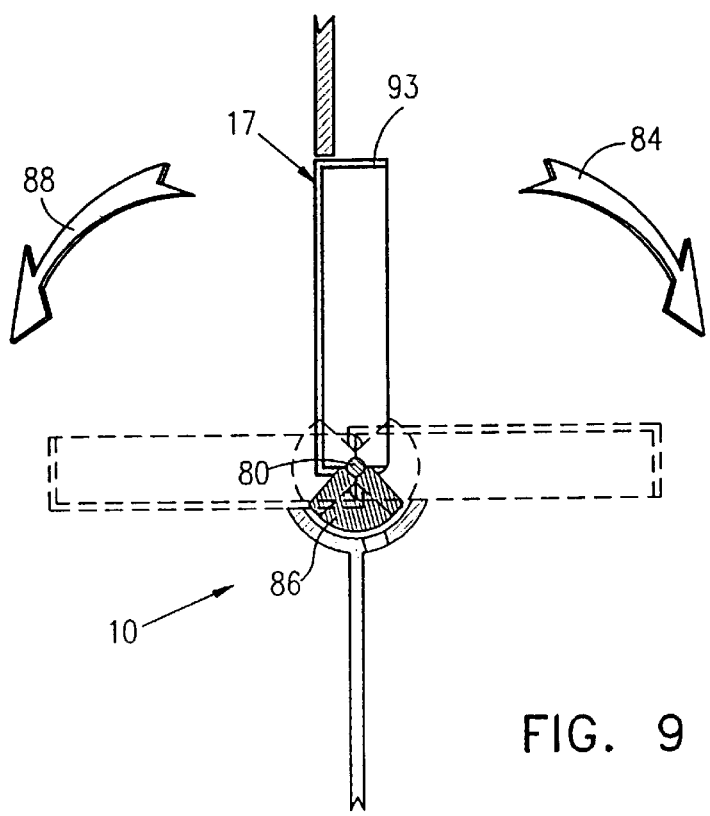
FIG. 9 is a simplified sectional illustration of the door of FIG. 8, taken along lines IX—IX in FIG. 8.
Figure 10:
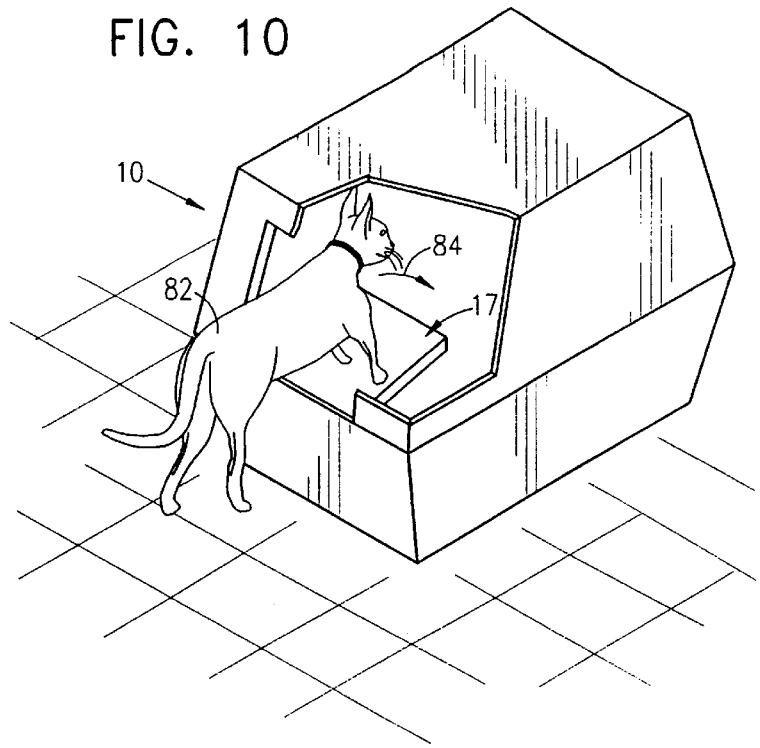
FIGS. 10 and 11 are simplified cutaway illustrations of a pet entering and exiting the litter box of FIG. 2A, respectively.

Reference is now made to FIGS. 8, 9, 10 and 11 which further illustrate entrance door 17. As seen in FIG. 9, door 17 is preferably pivotally attached to litter box 10 at a pivot 80. As seen in FIG. 10, a cat 82 wishing to enter litter box 10 can push against door 17, thereby causing door 17 to swing generally in the direction of an arrow 84. As seen in FIG. 9, door 17 preferably includes a counterweight 86 which restores door 17 to a closed position. It is appreciated that any other convenient method for automatically closing door 17 may be used, such as a spring.

Figure 11:
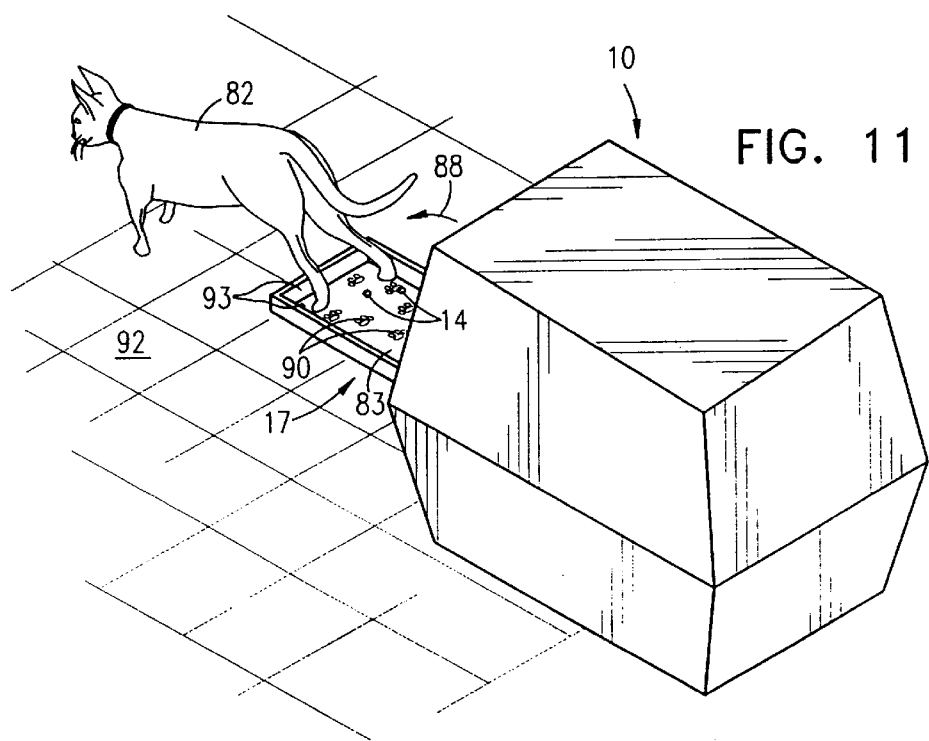

As seen in FIG. 11, when cat 82 leaves litter box 10, door 17 swings generally outwards and downwards in the direction of an arrow 88. In this position, door 17 serves as a doormat for cat 82 to tread upon when exiting litter box 10. As seen in FIG. 11, cat 82 leaves a plurality of tracks, marks, litter particles and/or debris, generally referenced by numeral 90, on a surface 83 of door 17, thereby substantially preventing cat 82 from tracking litter or debris in an area 92 where litter box 10 is located. Preferably surface 83 comprises or is coated with a hygroscopic material which substantially absorbs moisture from a paw of a pet.

Door 17 preferably includes an inwardly facing rim 93 which substantially prevents matter, such as litter 14, from spilling outwards from door 17 when door 17 is open. Any matter left on door 17 is substantially thrown back into litter box 10 when door 17 automatically closes.

Figure 12:
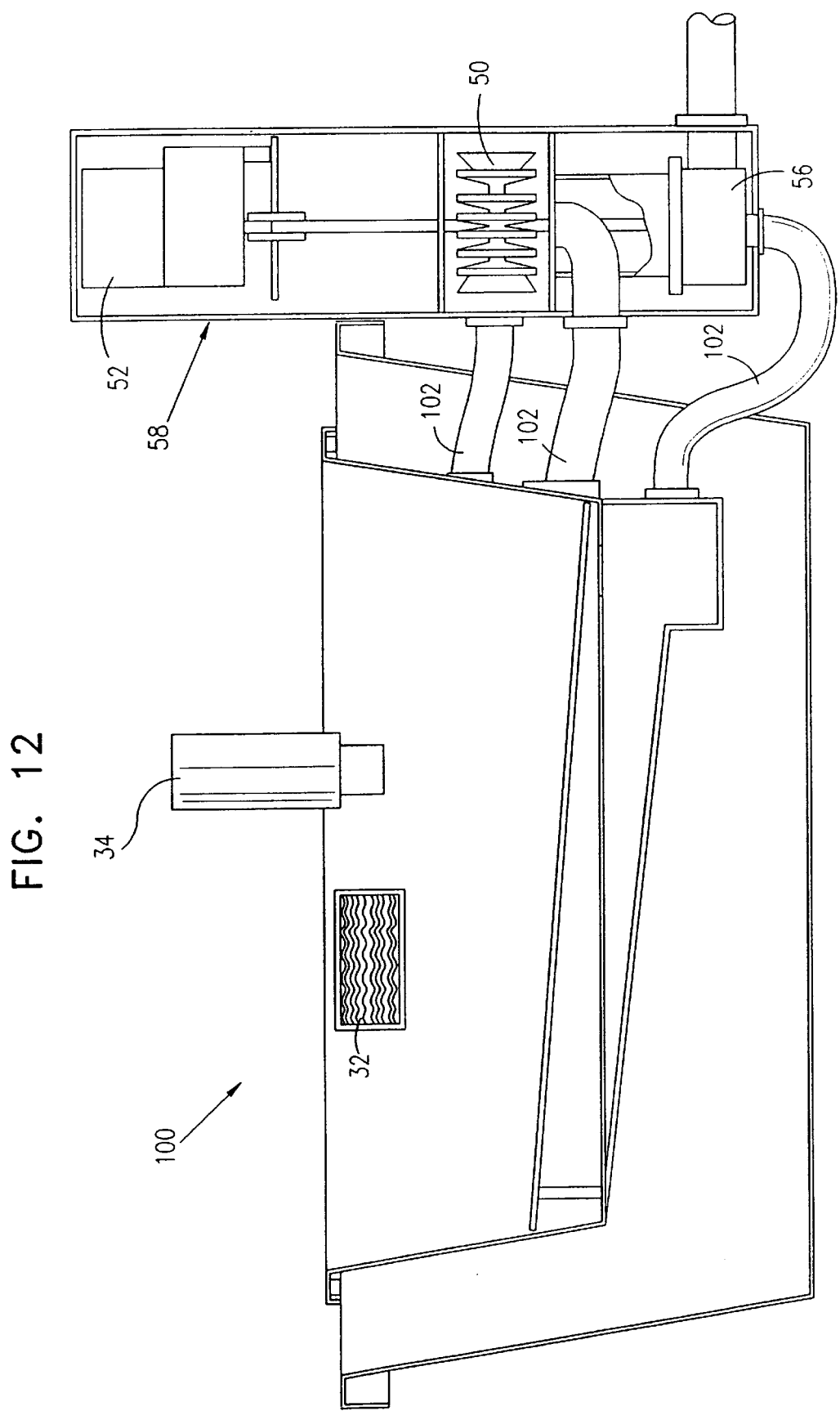
FIGS. 12, 13, 14 and 15 are simplified illustrations of four litter boxes, constructed and operative in accordance with alternative preferred embodiments of the present invention.

Reference is now made to FIG. 12 which illustrates a litter box 100, constructed and operative in accordance with another preferred embodiment of the present invention. Litter box 100 is preferably substantially identical to litter box 10 except that unit 58 which includes motor 52, impeller 50 and pump 56, is located outside of litter box 100 and is connected thereto by ducting 102.

Figure 13:
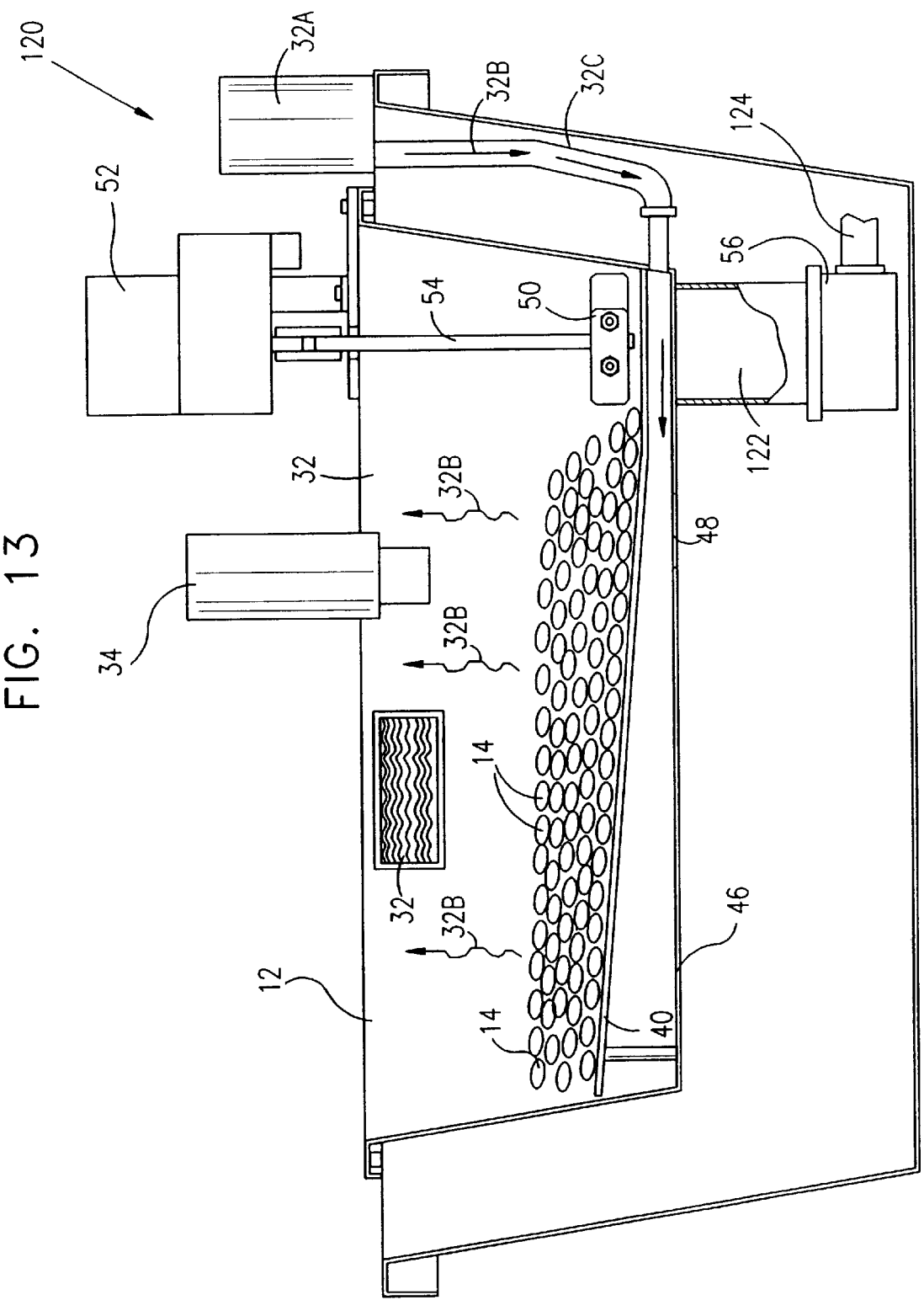

Reference is now made to FIG. 13 which illustrates a litter box 120, constructed and operative in accordance with another preferred embodiment of the present invention. Litter box 120 is preferably substantially identical to litter box 10 except that pump 56 is not powered by motor 52 but rather by a separate motor 122. In litter box 120, excreta 65 is ground by impeller 50 and then is filtered by filter tray 40 The filtered excreta 65 then falls towards pump 56 which pumps excreta 65 away front litter box 120 via ducting 124. FIG. 13 illustrates a dryer 32A that forces hot air 32B through a conduit 32C and through litter 14.

Figure 14:
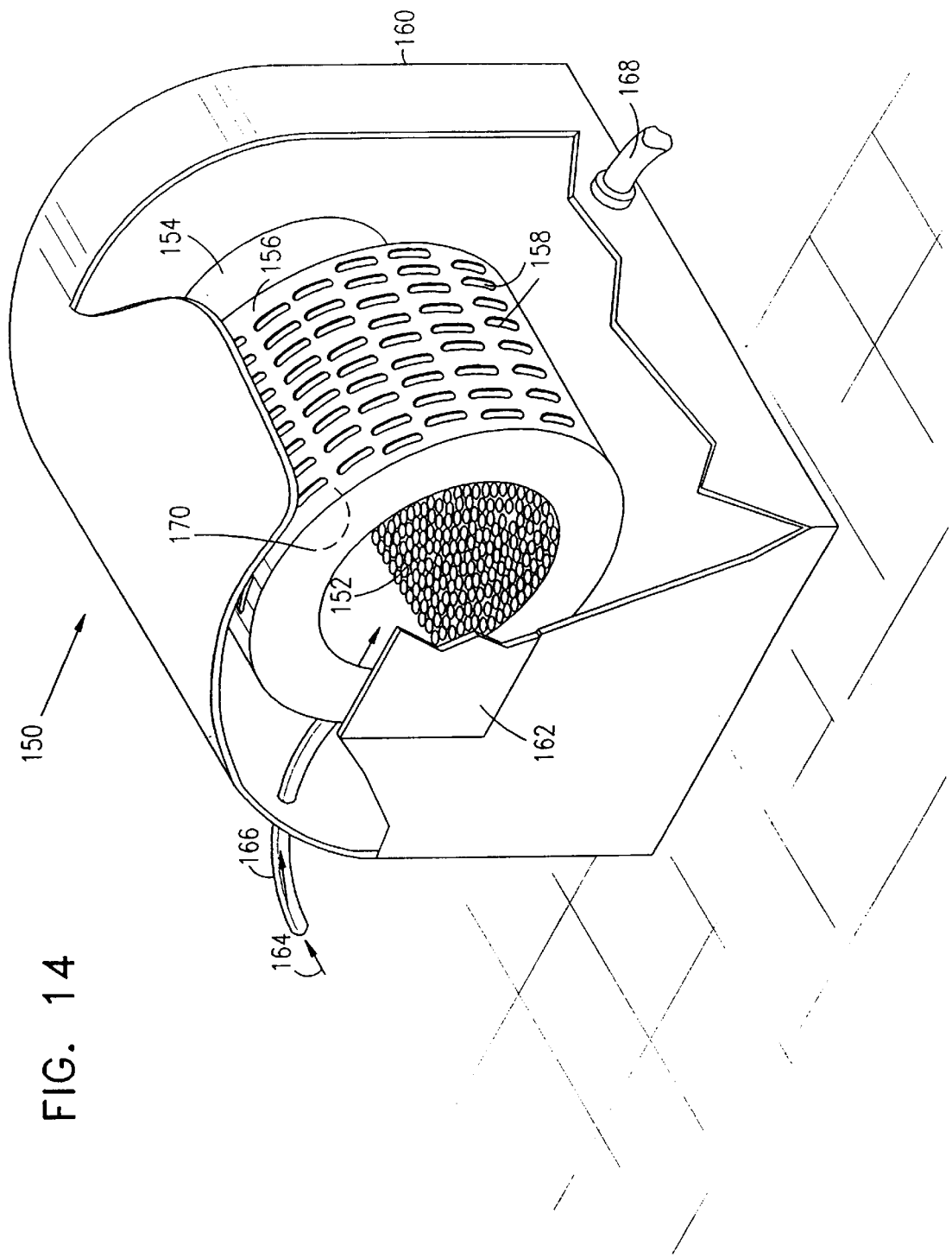

Reference is now made to FIG. 14 which illustrates a litter box 150, constructed and operative in accordance with still another preferred embodiment of the present invention. Litter box 150 preferably includes litter 152, substantially identical to litter 14, and a grinder which includes a motor 154 which is connected to and rotates a drum 156. Drum 156 preferably includes a plurality of elongate holes 158 for filtering excreta and for allowing cat hairs to pass therethrough, in a similar manner as described hereinabove for litter box 10.

Litter box 150 preferably includes a housing 160 with a door 162. A cleansing liquid 164 may be introduced into drum 156 via an inlet duct 166 either from a reservoir or domestic water apparatus (not shown). An exit pipe 168 is preferably provided for removal therethrough of excreta and waste material.

Drum 156 may include an abrasive surface 170, such as an inner surface, so that when drum 156 rotates it agitates any excreta, litter 152 and cleansing liquid, thereby causing litter 152 to be cleansed and excreta to be ground by abrasive surface 170. The tumbling action of drum 156 also causes friction between adjacent excreta particles and between excreta and litter 152 which may cause grinding of the excreta. Elongate holes 158 may include inwardly facing burrs or other abrasive structure for enhancing grinding of excreta.

Figure 15:
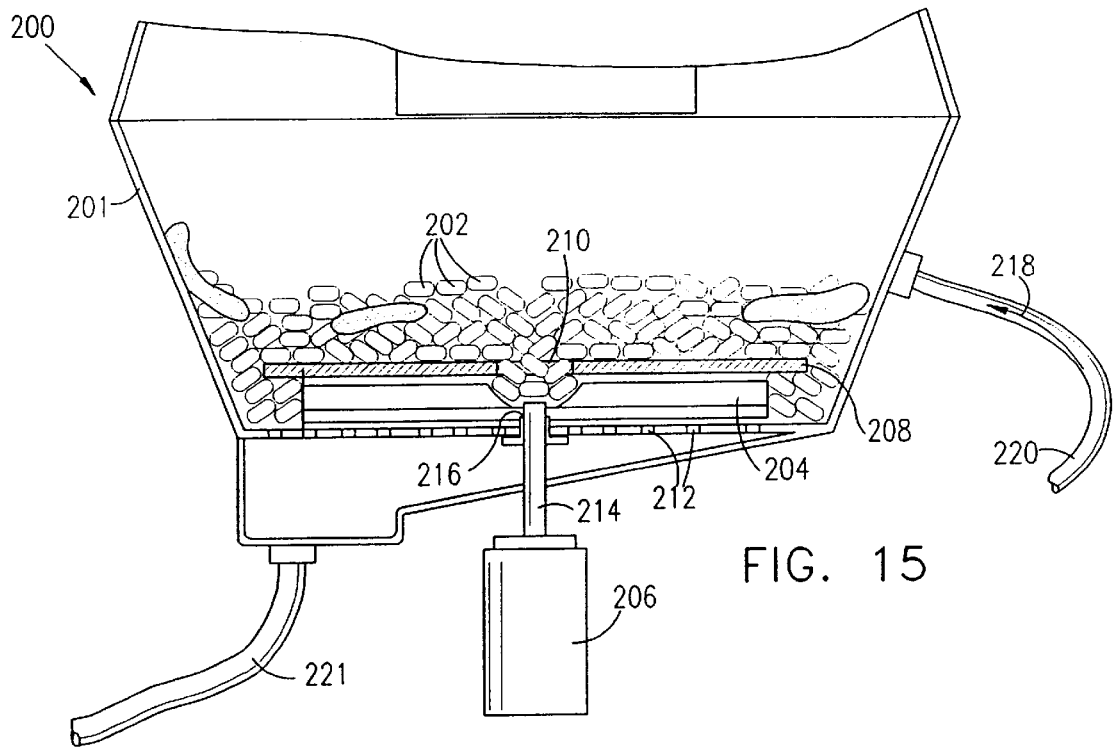

Reference is now made to FIG. 15 which illustrates a litter box 200, constructed and operative in accordance with yet another preferred embodiment of the present invention. Litter box 200 preferably includes a litter compartment 201, in which is disposed litter 202, and an impeller 204 driven by a motor 206. A portion of litter 202 preferably rests on a tray 208 which has a central hole 210 formed therein. At the bottom of litter compartment 201 are preferably formed filter holes 212 for filtering therethrough excreta and waste matter. A shaft 214 of motor 206 which extends through the bottom of litter box 200 to impeller 204 is preferably sealed with an O-ring 216. A cleansing liquid 218 may be introduced into litter box 200 via an inlet port 220. An exit pipe 221 is preferably provided for removal therethrough of excreta and waste material. Exit pipe 221 may be in fluid communication with a siphon (not shown) which may serve as a water break for substantially preventing odors from wafting through exit pipe 221 towards litter box 200.

Figure 16:
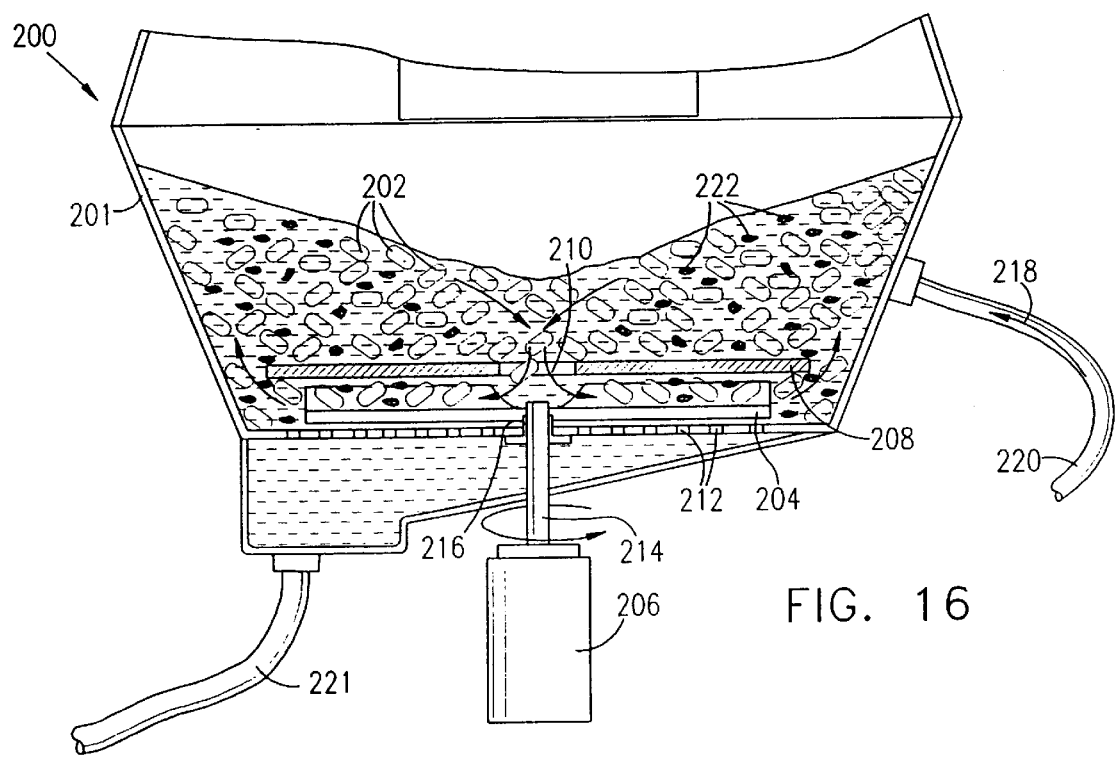
FIG. 16 is a simplified illustration of the litter box of FIG. 15 being used to cleanse litter and grind excreta.

Reference is now made to FIG. 16 which illustrates operation of litter box 200. As motor 206 rotates impeller 204, a centrifugal motion is imparted to a plurality of excreta 222, litter 202 and cleansing liquid 218, such that they are thrown against inner surfaces of litter box 200. This helps to thoroughly cleanse the inner sides of litter box 200.

It is appreciated that the grinding apparatus of the litter boxes described hereinabove are only illustrative of grinders which may be used with the present invention, and other pulverizing and/or grinding devices may also be used as well.

Figure 17:
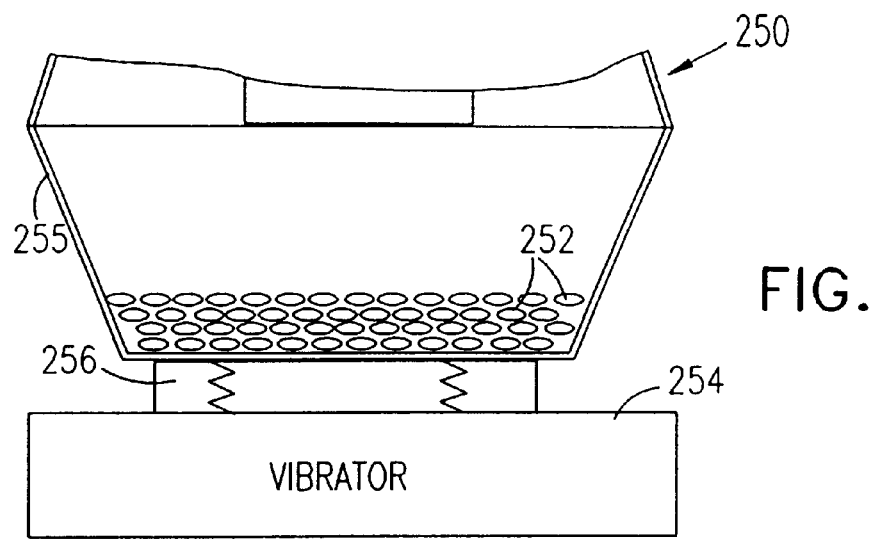
FIGS. 17 and 18 are simplified illustrations of two litter boxes, constructed and operative in accordance with other alternative preferred embodiments of the present invention.

Reference is now made to FIG. 17 which illustrates a litter box 250, constructed and operative in accordance with an alternative preferred embodiments of the present invention. Litter box 250 preferably includes litter 252 and a grinder which comprises a vibrator 254. Litter 252 is preferably disposed in a litter compartment 255 which is supported by an assembly 256 which may include sprints. Vibrator 254 vibrates litter compartment 255, and the vibratory motion of vibrator 254 cleanses litter 252.

Figure 18:
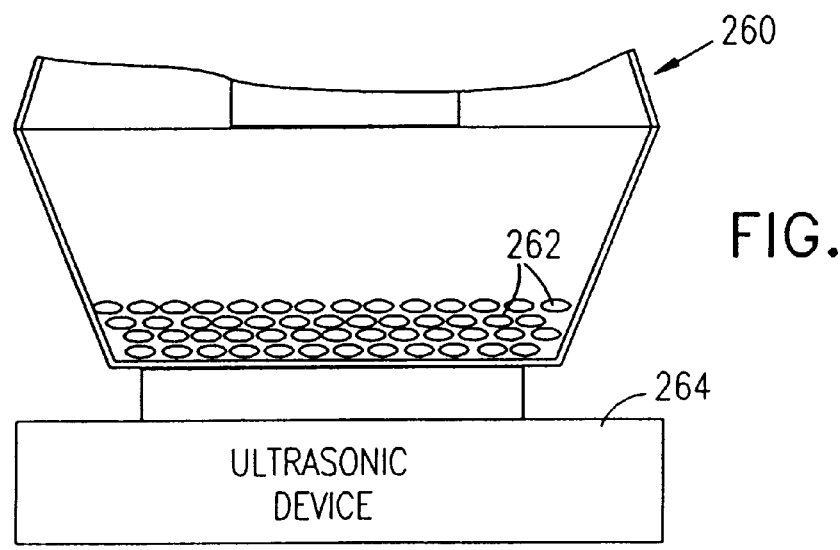

Reference is now made to FIG. 18 which illustrates a litter box 260, constructed and operative in accordance with an alternative preferred embodiments of the present invention. Litter box 260 preferably includes litter 262 and a grinder which comprises an ultrasonic device 264. A cleansing liquid (not shown) may be introduced into litter box 260 for cleansing litter 262. Ultrasonic device 264 grinds any excreta found in litter box 260 by abrasive agitation thereof. The agitating motion of ultrasonic device 264 also enhances cleansing of litter 262.

Reference is now made to FIGS. 19–24B which illustrate apparatus, constructed and operative in accordance with a preferred embodiment of the present invention, for connecting any of the litter boxes of the present invention with a sewage system.

Figure 19:
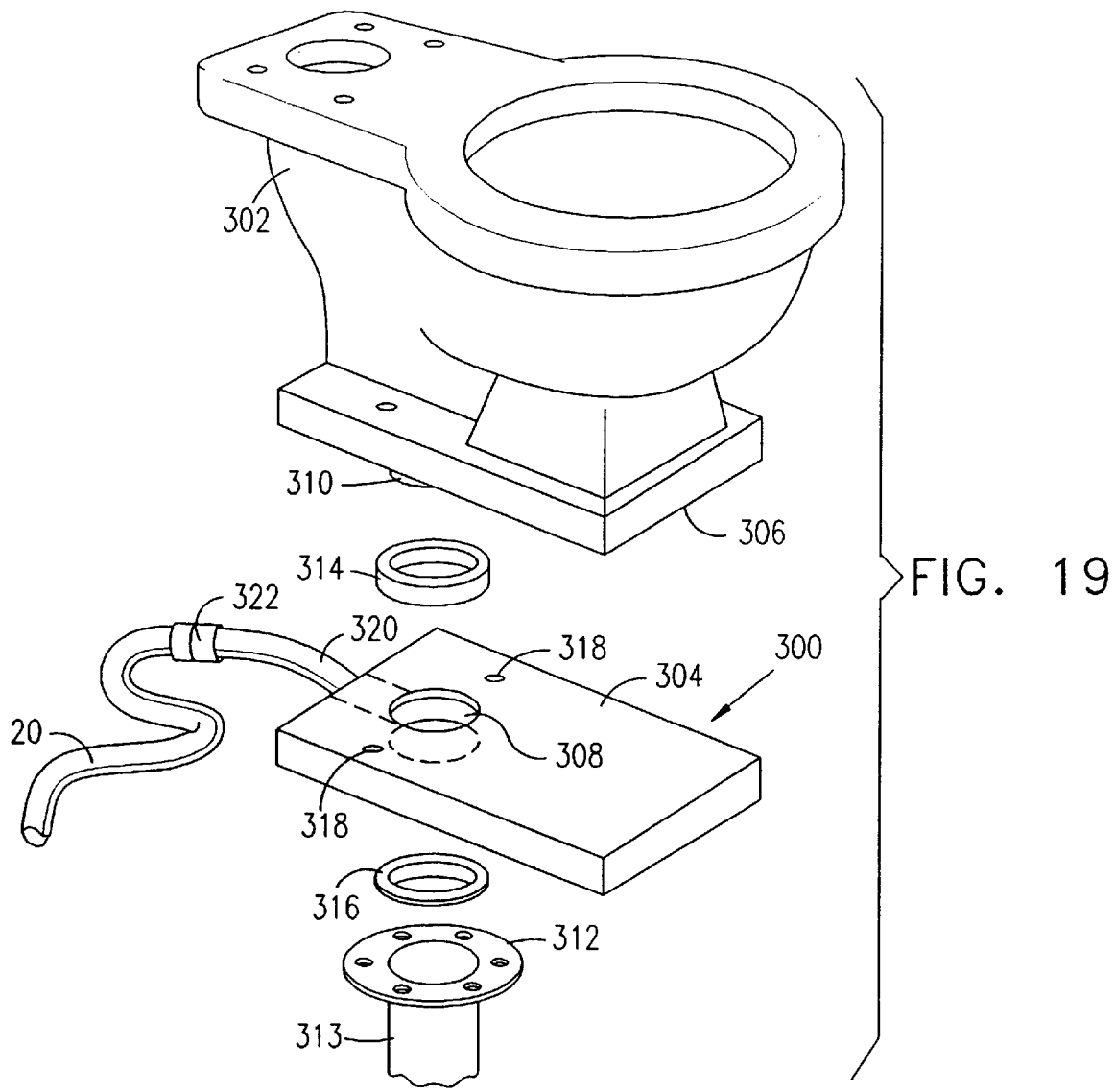
FIG. 19 is a simplified exploded illustration of an adaptor device, constructed and operative in accordance with a preferred embodiment of the present invention, for connecting any of the litter boxes of the present invention with a sewage system.

Referring to FIG. 19, it is seen that an adaptor device 300 may be installed, either by a plumber or a "do-it-yourselfer", underneath a toilet bowel 30. Adaptor device 300 preferably includes a top surface 304 upon which rests a bottom surface 306 of toilet 302. Adaptor device 300 preferably has a hole 308 formed generally perpendicular to top surface 304 into which fits a discharge horn 310 of toilet bowl 302 As seen in FIG. 19, adaptor device 300 is thus located between bottom surface 306 of toilet bowl 302 and a floor flange 312 of a discharge pipe 313, flange 312 being aligned with hole 308. A wax seal 314 preferably substantially seals horn 310 with hole 308 and another seal 316 may be provided for sealing hole 308 with flange 312. Preferably two mounting holes 318 are provided for mounting adaptor device 300 to the existing holes in the floor of a typical domestic toilet installation.

Adaptor device 300 preferably includes a transverse pipe 320 in fluid communication with hole 308. Transverse pipe 320 may be connected via a connector 322 to exit pipe 20 of any of the litter boxes of the present invention. Thus, by connecting exit pipe 20 to adaptor device 300, the waste material and/or odors from the litter box may be directly disposed of into discharge pipe 313. Adaptor device 300 may also be used in conjunction with an exhaust fan mounted on toilet bowl 302 (or in the litter box) to discharge odors from toilet bowl 302 directly down through discharge pipe 313.

Figure 20:
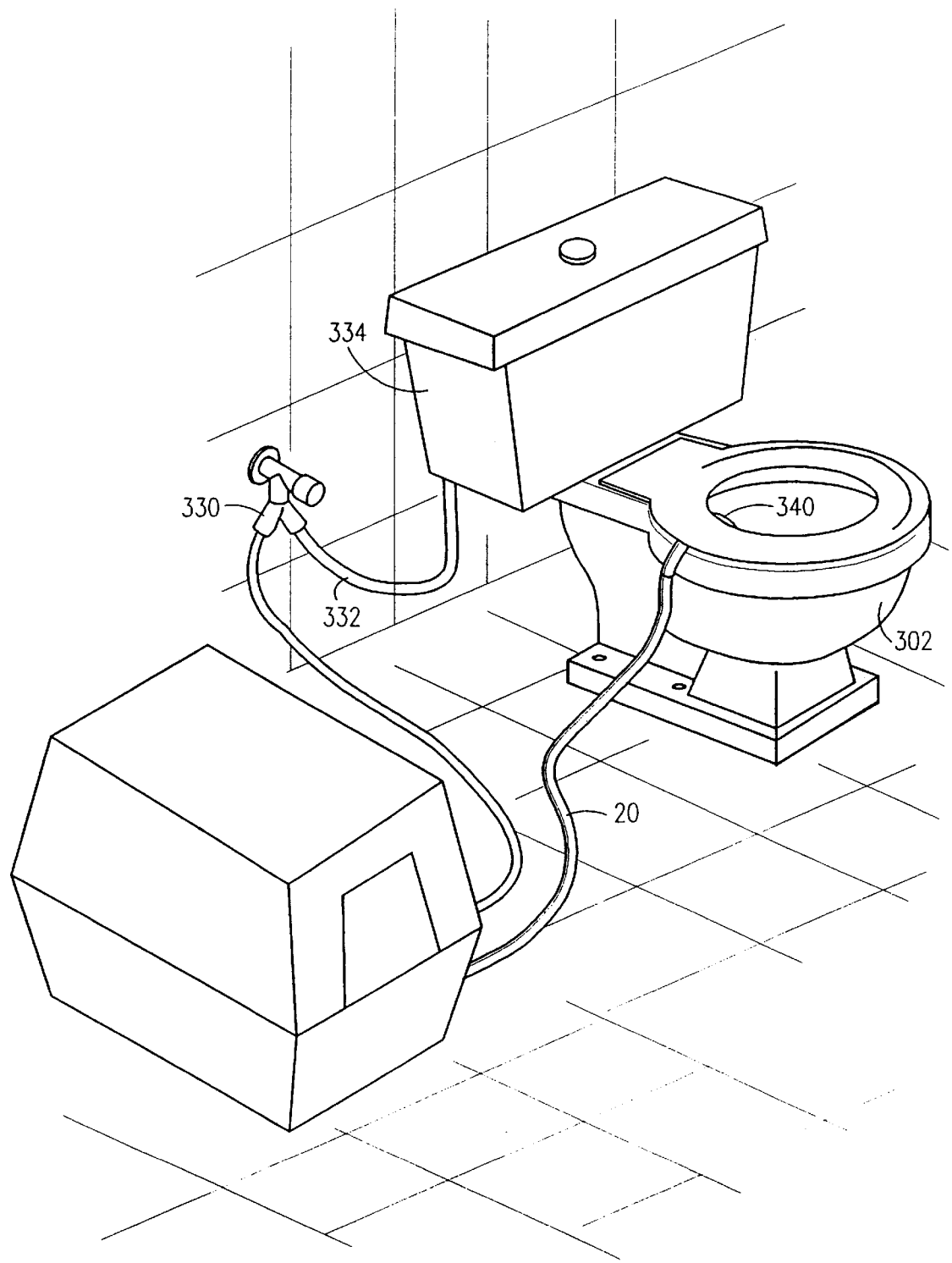
FIG. 20 is a simplified illustration of a connection of any of the litter boxes of the present invention to a toilet, in accordance with a preferred embodiment of the present invention.

Reference is now made to FIG. 20 which illustrates another connection of the litter box to toilet 302 in accordance with a preferred embodiment of the present invention. It is seen that water may be supplied to the litter box via a tee connector 330 on a supply line 332 of a water tank 334 of toilet bowl 302. Exit pipe 20 may terminate in a shepherd's crook like bend 340. Bend 340 is simply hooked on a side of toilet bowl 302 for discharging waste thereinto.

Figure 21A:
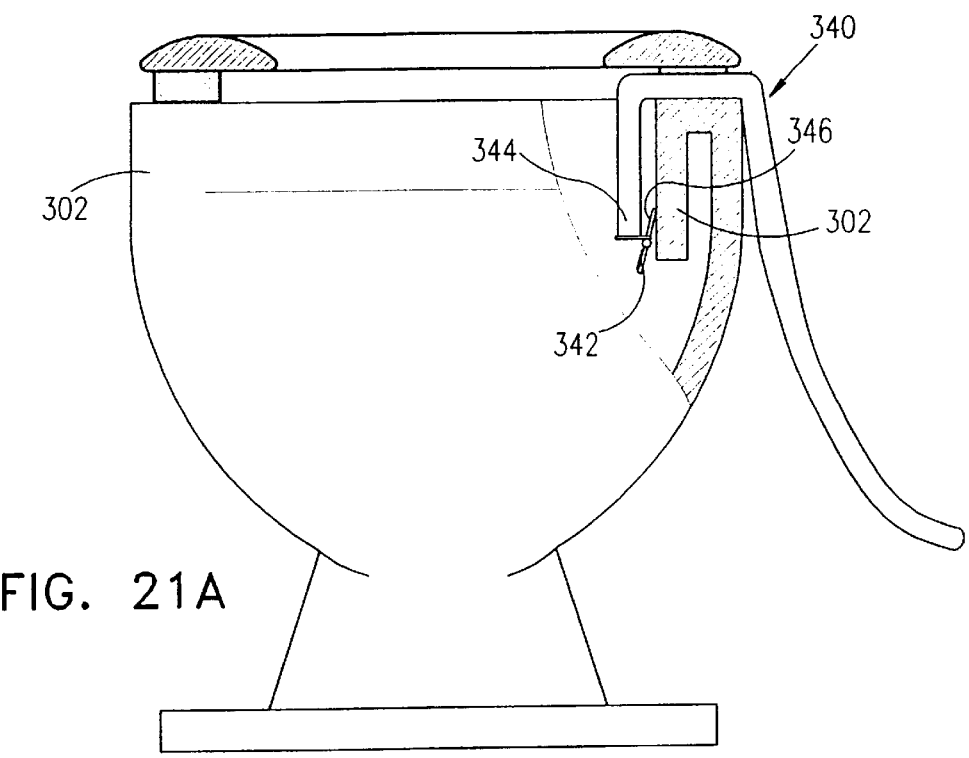
FIGS. 21A and 21B are two further simplified illustrations of connection apparatus of FIG. 20, respectively hooked and not hooked to a toilet bowl.
Figure 21B:
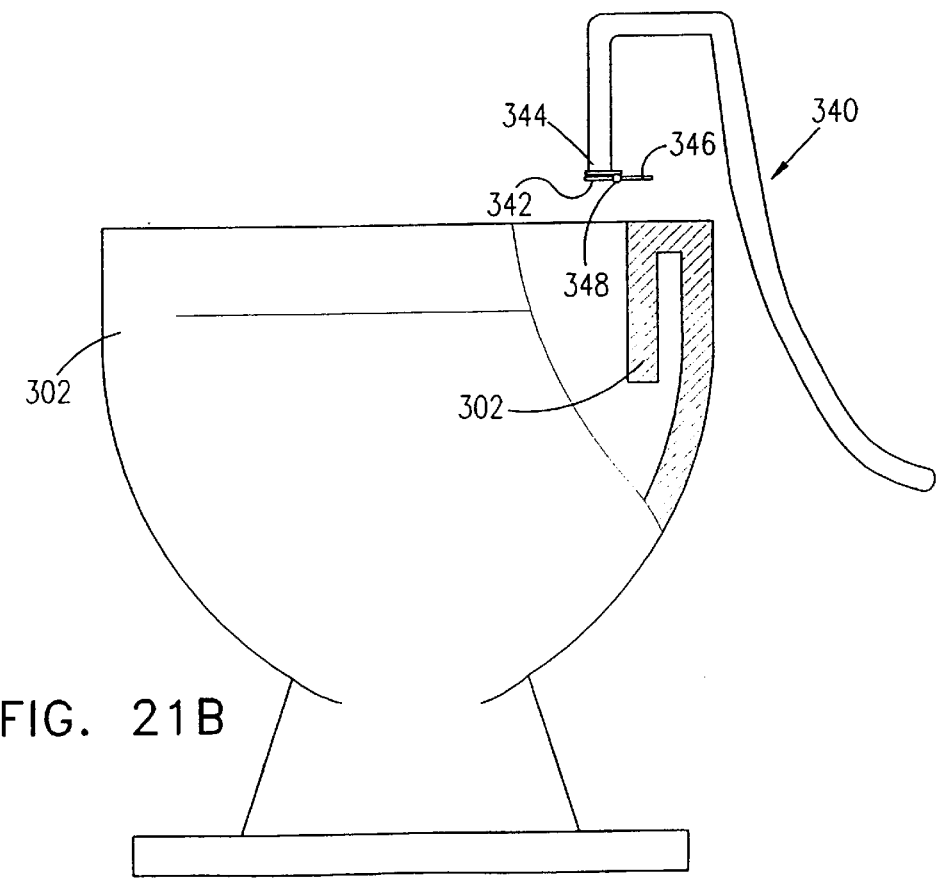

Reference is now made to FIGS. 21A and 21B which illustrate bend 340 in more detail. Bend 340 preferably includes a spring-loaded safety cap 342 at an extreme end 344 thereof. When bend 340 is hooked onto toilet bowl 302, as seen in FIG. 21A, a protruding lip 346 of cap 342 is pressed against a side of toilet bowl 302 and waste material can flow unobstructed through end 344 into toilet bowl 302. If bend 340 is not hooked onto toilet bowl 302, as seen in FIG. 21B, a biasing member, such as a small coil spring 348, urges cap 342 against end 344, thereby substantially sealing end 344 from unwanted liquid discharge or leaks therethrough.

Figure 22:
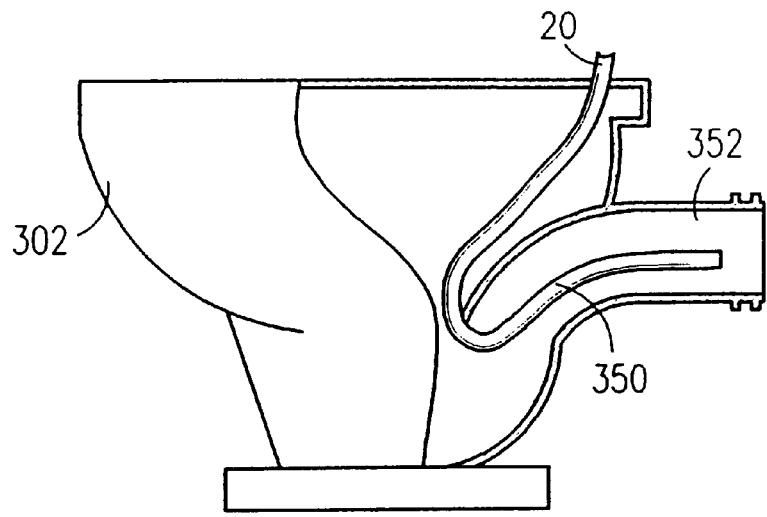
FIG. 22 is a simplified illustration of a connection of any of the litter boxes to a toilet, in accordance with another preferred embodiment of the present invention.

Reference is now made to FIG. 22 which illustrates a further connection of the litter box to toilet 302 in accordance with a preferred embodiment of the present invention Exit pipe 20 preferably terminates in a bendable, resilient pipe 350 which cain be snaked into toilet bowl 302 to be in direct fluid communication with a discharge end 352 of toilet bowl 302. It is appreciated by persons skilled in the art that the installed litter box is preferably provided with some kind of water break for substantially preventing odors from wafting through exit pipe 20 towards the litter box. The bend in resilient pipe 350 may additionally serve as such a water break. It is also appreciated by persons skilled in the art that positive air pressure, such as from a blower used to dry the litter material or any other fan in the litter box, may also be used to drive odors into the discharge end 352 of toilet bowl 302.

Figure 23:
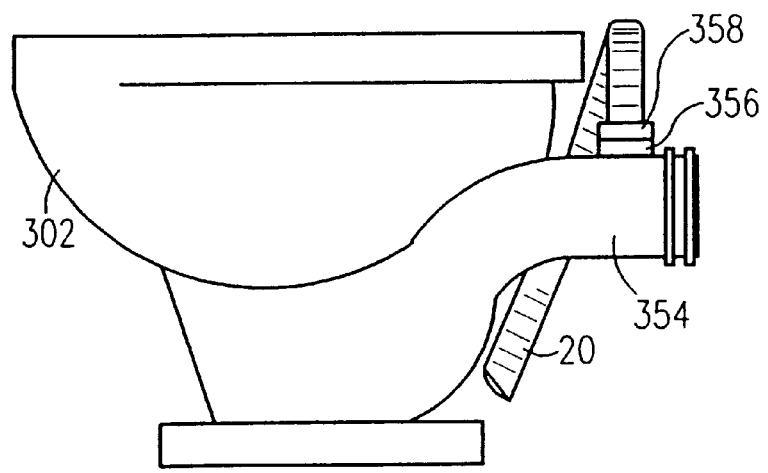
FIG. 23 is a simplified illustration of a connection of any of the litter boxes to toilet bowl, in accordance with yet another embodiment of the present invention.

Reference is now made to FIG. 23 which illustrates another connection of the litter box to toilet bowl 302. In the illustrated embodiment, toilet bowl 302 is supplied with a discharge pipe 354 which has a threaded coupling 356. Exit pipe 20 may be terminated in a threaded end 358 which may be connected to coupling 356.

Figure 24A:
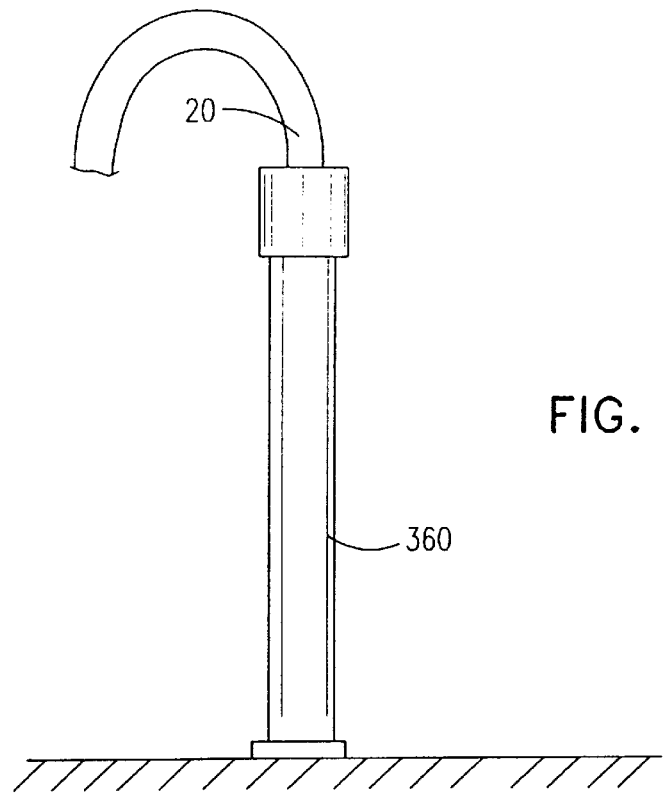
FIGS. 24A and 24B are simplified illustrations of connection of the litter box to a washing machine discharge pipe, in accordance with alternative preferred embodiments of the present invention.
Figure 24B:
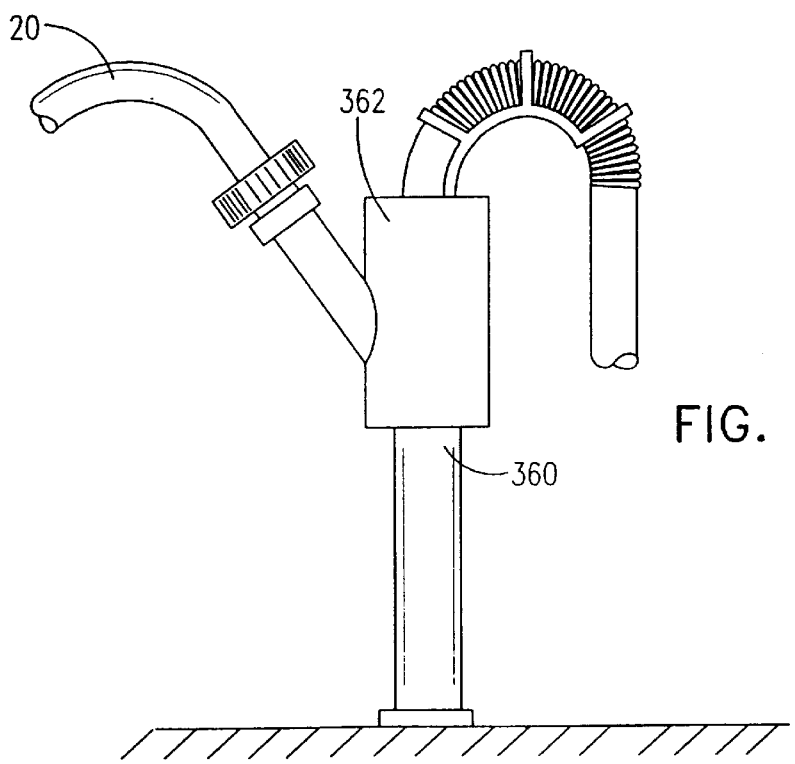

Reference is now made to FIGS. 24A and 24B which illustrate connection of the litter box to a washing machine discharge pipe 360, in accordance with alternative preferred embodiments of the present invention. In FIG. 24A, exit pipe 20 is directly fit into discharge pipe 360. In FIG. 24B, exit pipe 20 is connected to a tee-connector 362 which is in fluid communication with discharge pipe 360.

Figure 25:
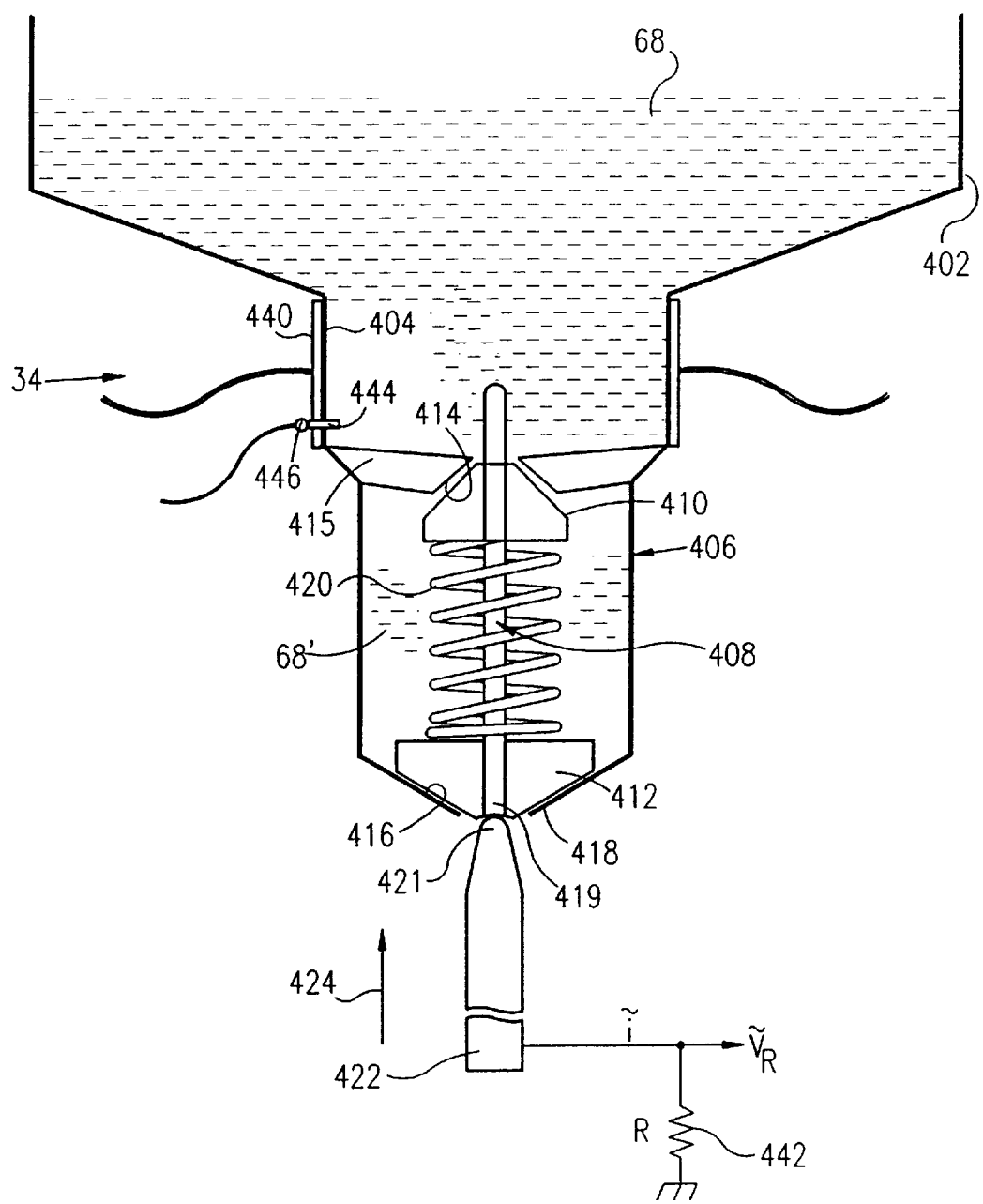
FIG. 25 is a simplified illustration of a dispenser useful in the litter box of the present invention, constructed and operative in accordance with a preferred embodiment of the present invention.

Reference is now made to FIG. 25 which illustrates dispenser 34 constructed and operative in accordance with a preferred embodiment of the present invention. Dispenser 34 preferably includes a reservoir 402 for containing therein detergent 68. Extending from a neck 404 of reservoir 402 is a dispensing portion 406, typically, although not necessarily, cylindrical in shape. Disposed longitudinally in dispenser portion 406 is a shaft 408. A pair of stoppers 410 and 412 are fitted on shaft 408 and are respectively adapted to sealingly abut against an aperture 414 formed in a portion 415 of neck 404 adjoining dispenser portion 406 and an aperture 416 formed at an end 418 of dispenser portion 406 opposite to portion 415. A biasing device 420, such as a coil spring, is biased against portion 415 and normally urges stopper 412 against aperture 416 and distances stopper 410 from aperture 414, this orientation being illustrated in FIG. 25.

FIG. 25 illustrates dispenser 34 with dispenser portion 406 pointed downwards, this being the orientation of dispenser 34 when installed in litter box 10 (not shown in FIG. 25). It is appreciated that dispenser 34 may be stored in a position inverted from that of FIG. 25. In the orientation of FIG. 25, detergent 68 can flow from reservoir 402 through aperture 414 into dispenser portion 406, and is sealingly trapped in dispenser portion 400 by the action of biasing device 420 urging stopper 412 against aperture 416. An end 419 of shaft 408 abuts against an end 421 of a pin 422 preferably longitudinally aligned with shaft 408.

Application of a force by pin 422 in the direction of an arrow 424 to shaft 408 of sufficient magnitude to overcome the counter force of biasing device 420 pushes stopper 412 away from aperture 416, and almost immediately thereafter, urges stopper 410 to sealingly abut against aperture 414. This force may be applied in a number of ways which will be described further hereinbelow. Upon stopper 412 being moved away from aperture 416, the amount of detergent 68 which had filled dispenser portion 406, designated by reference numeral 68', is emptied from dispenser portion 406 into litter box 10 (not shown in FIG. 25). Stopper 410 abuts against aperture 414 in a very short time after aperture 416 is opened for egress therethrough of detergent 68', this time being typically a fraction of a second. During this short time delay, a negligible quantity of detergent 68 may further flow into dispenser portion 406 from reservoir 402, this negligible quantity emptying through open aperture 416 as well. Emptying of dispenser portion 406 typically takes a up to few seconds. Ambient air replaces the detergent 68' inside dispenser portion 406.

Upon release of the upward force of pin 422 on shaft 408, biasing device 420 again urges stopper 412 to its sealed position against aperture 416 and stopper 410 is moved away from aperture 414, thereby allowing a fresh quantity of detergent 68 to flow into dispenser portion 406. Any trapped air in dispenser portion 406 bubbles out through aperture 414 into reservoir 402. Dispenser 34 is now ready for dispensing an additional portion of detergent 68'.

Figure 26:
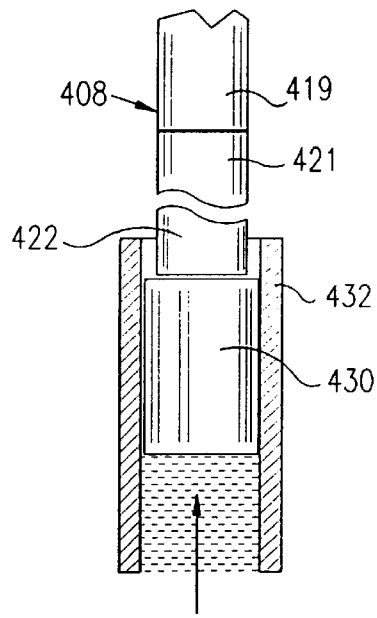
FIGS. 26–29 are simplified illustrations of four different embodiments for providing an upward force on a shaft of the dispenser of FIG. 25.

Reference is now made to FIGS. 26–29 which illustrate different embodiments for providing the upward force of pin 422 on shaft 408. In FIG. 26, a piston 430 may be arranged to be buoyed upwards against pin 422 by the force of incoming liquid 66. Piston 430 may be slidingly disposed in a tube 432, as well as pin 422. Alternatively, a membrane may be used in place of a piston. Liquid 66 applies a buoyant force on piston 430 all during the cleaning process of litter box 10 (not shown in FIG. 26) as described hereinabove. After release of the upward force, piston 430 drops and, as described above with reference to FIG. 25, biasing device 420 again urges stopper 412 to its sealed position against aperture 416 and stopper 410 is moved away from aperture 414, thereby allowing a fresh quantity of detergent 68 to flow into dispenser portion 406.

Figure 27:
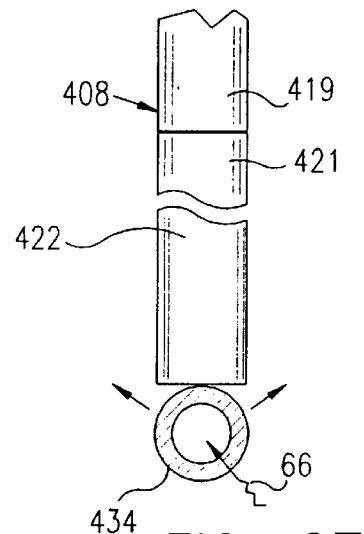

In FIG. 27, an expandable tube 434 is arranged to abut pin 422. Tube 434 may be made of an elastomer, such as rubber. Liquid 66 entering tube 434 causes tube 434 to expand, thereby applying an upward force against pin 422.

Figure 28:
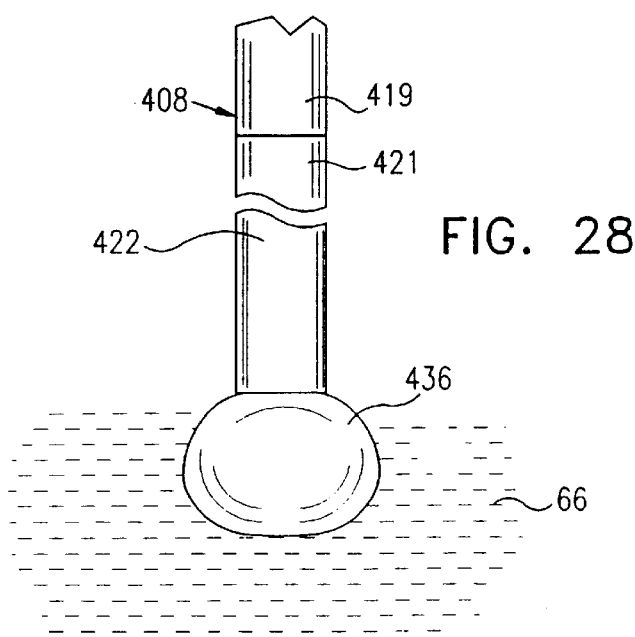

In FIG. 28, pin 422 terminates in a float 436 which may be buoyed upwards by liquid 66 similarly as described previously in FIGS. 25 and 26.

Figure 29:
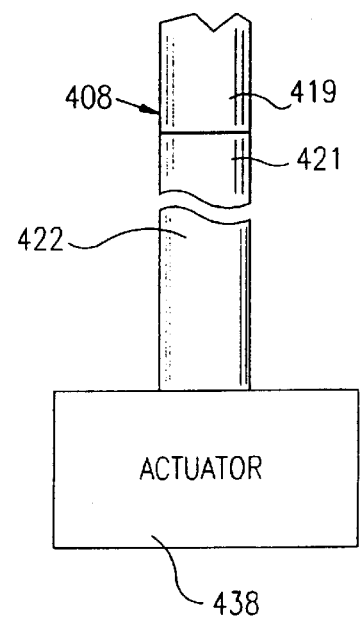

In FIG. 29, an actuator 438 abuts pin 422 and is operable to apply an upward force on pin 422. Actuator 438 may be mechanical, hydraulic, electrical, electronic or electromagnetic, for example, and may be actuated by the inlet valve (not shown) which controls inlet of liquid 66 into litter box 10 (not shown in FIG. 29). In the case of an electromagnetic valve and actuator, the same electromagnet of the valve may be used as the actuator to provide the upward force against pin 422.

As described above, dispenser 34 ensures dispensing the proper amount of detergent 68 and prevents leaking of detergent 68 from dispenser 34 before dispensing into litter box 10. In accordance with a preferred embodiment of the present invention, dispenser 34 provides an identification indication that the dispenser is installed and that it is authorized for use, and an indication of the level of the detergent in dispenser 34, so that, for example, a user is alerted to the need for replacing an empty dispenser with a full one. These features will now be described with reference again to FIG. 25, and with additional reference to FIGS. 30–32.

Figure 30:
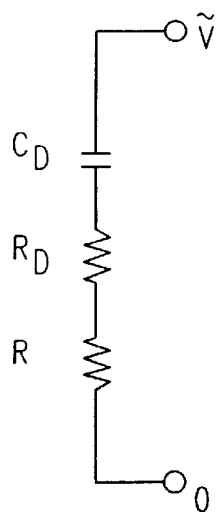
FIGS. 30–32 are simplified electrical schematic diagrams of circuits useful in providing an indication of the presence of a correct dispenser installed in the litter box of the present invention and of providing an indication of the level or presence of detergent in the dispenser.

Preferably shaft 408 and pin 422 are made of an electrically conductive, and an electrically conductive ring 440 around neck 404. Ring 440 may be attached to, coated on or painted on neck 404, for example. Alternatively, ring 440, instead of being part of neck 404, may be part of litter box 10. As seen in FIG. 30, a capacitance $C_D$ is set up between ring 440 and detergent 68 which is an electrolyte. An electrical resistance $R_D$ is created by the presence of liquid 68' between shaft 408 and the inner periphery of dispenser portion 406. An external resistor 442 with resistance R is preferably provided.

When dispenser 34 is installed in litter box 10, shaft 408 electrically contacts pin 422, stopper 412 abutting against aperture 416. An electrical circuit is set up between alternating voltage $\tilde{V}$ and O. The presence of electrolytic detergent 68 creates a current $\tilde{i}$ and a voltage $\tilde{V}_R$, and $R_D$ drops due to the presence of detergent 68. If no detergent 68 is present, then $R_D$ approaches ∞ and current $\tilde{i}$ and voltage $\tilde{V}_R$ approach zero, this being an indication that the dispenser 34 is installed, that it is the correct type of dispenser and that there is detergent in the dispenser.

Figure 31:
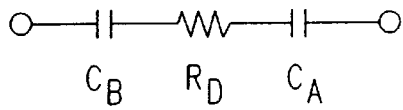
Figure 32:
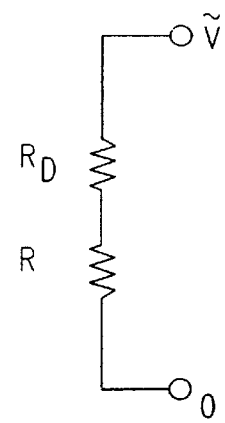

Alternatively, ring 440 may comprise a pair of capacitors $C_A$ and $C_B$ which act as a sensor for sensing, varying capacitance. As seen in FIG. 31, the circuit of capacitors $C_A$ and $C_B$ and resistor $R_D$ may be used to indicate the presence of detergent 68 as described hereinabove with reference to FIGS. 25 and 30.

As a further alternative, an electrically conductive pin 444 may be attached to neck 404 in place of or in addition to ring 440. Pin 444 is in electrical contact both with detergent 68 and with an external electrical contact 446. Upon proper installation of dispenser 34 in litter box 10, an electrical circuit is created by the electrical contact between pin 444 and contact 446, detergent 68', shaft 408 and pin 422, this circuit being illustrated schematically in FIG. 32. The placement of ring 440 and/or pin 444 on neck 404 determines when a low detergent level indication is provided.

Figure 33:
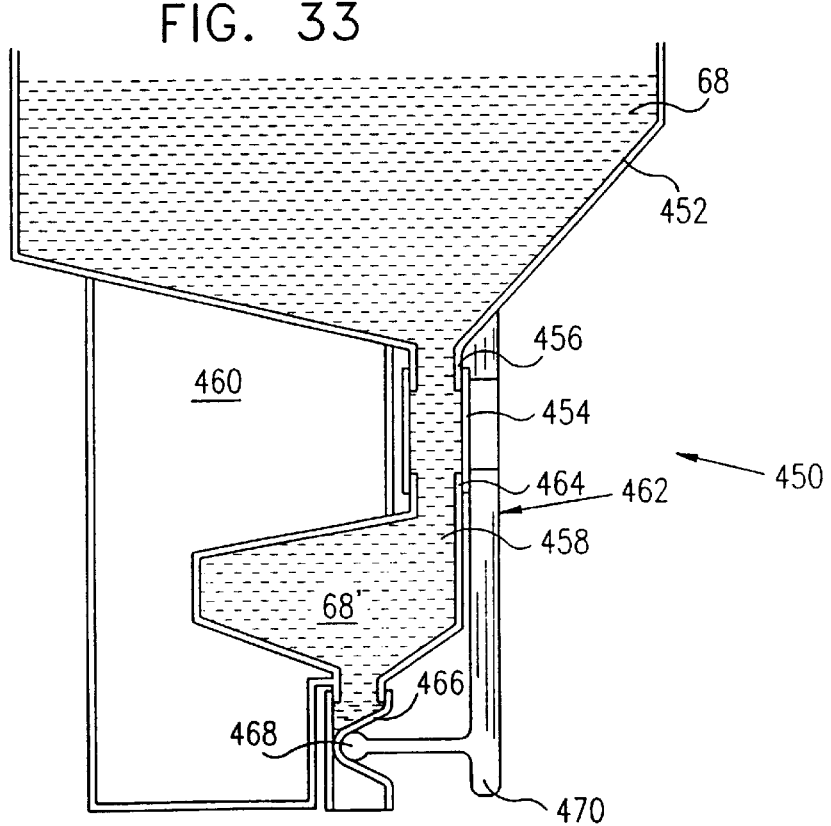
FIG. 33 is a simplified illustration of a dispenser useful in the litter box of the present invention, constructed and operative in accordance with another preferred embodiment of the present invention.

Reference is now made to FIG. 33 which illustrates a dispenser 450 constructed and operative in accordance with another preferred embodiment of the present invention. Dispenser 450 preferably includes a reservoir 452 for containing therein detergent 68. A flexible portion 454 is connected at one end thereof to a neck 456 of reservoir 452, and at an opposite end thereof to a dispenser portion 458. Flexible portion 454 is typically, although not necessarily, formed of a elastomeric tube. Dispenser portion 458 is a volume bounded by a flange member 460 of dispenser 450 and by an outwardly facing valve element 462. Valve element 462 has a throat 464 attached to flexible portion 454. A second flexible portion 466 is attached to an end of dispenser portion 458 opposite to that of flexible portion 454. As seen in FIG. 33 a profusion 468 of valve element 462 initially pinches flexible portion 466, thereby sealing dispenser portion 458, whereas flexible portion 454 is initially open allowing an amount of detergent 68 to fill dispenser portion 458 designated by reference numeral 68', as in FIGS. 25–32. It is seen that valve element 462 preferably includes a tang 470 at an end thereof.

Figure 34:
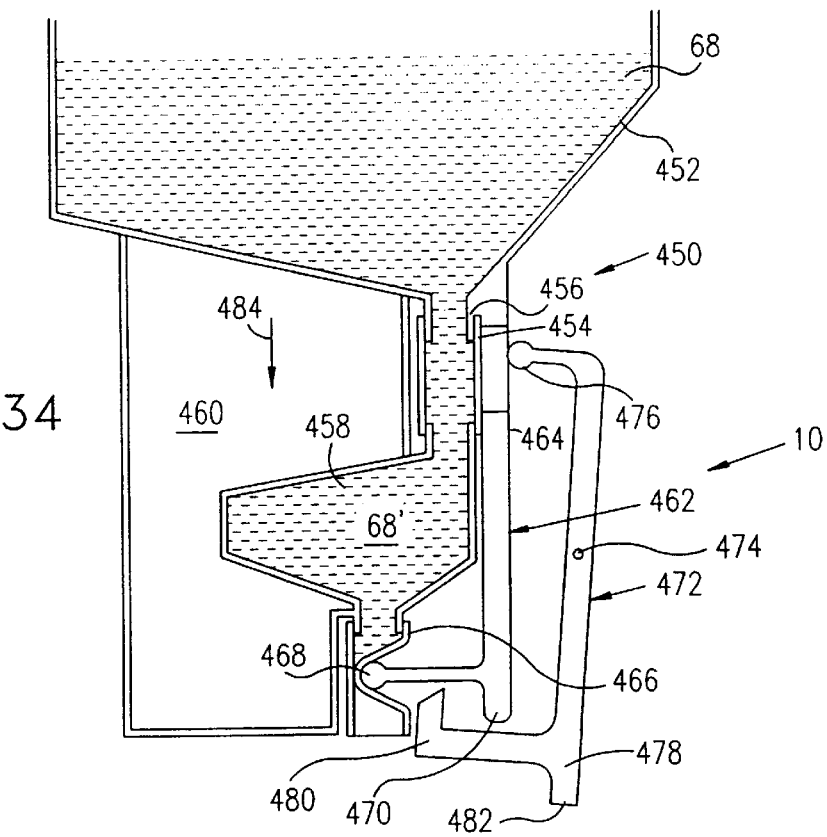
FIG. 34 is a simplified illustration of the dispenser of FIG. 33 installed in the litter box of the present invention.

Reference is now made to FIG. 34 which illustrates dispenser 450 installed in litter box 10. Litter box 10 preferably includes a cam 472 pivoted about a pivot 474. Cam 472 preferably includes an upper tang 476 and a lower portion 478 which comprises a pair of teeth 480 and 482. Installation of dispenser 450 into litter box 10 requires pushing dispenser 450 in the direction of an arrow 484 until tang 470 is aligned opposite tooth 480 and flexible portion 454 is aligned opposite upper tang 476.

Figure 35:
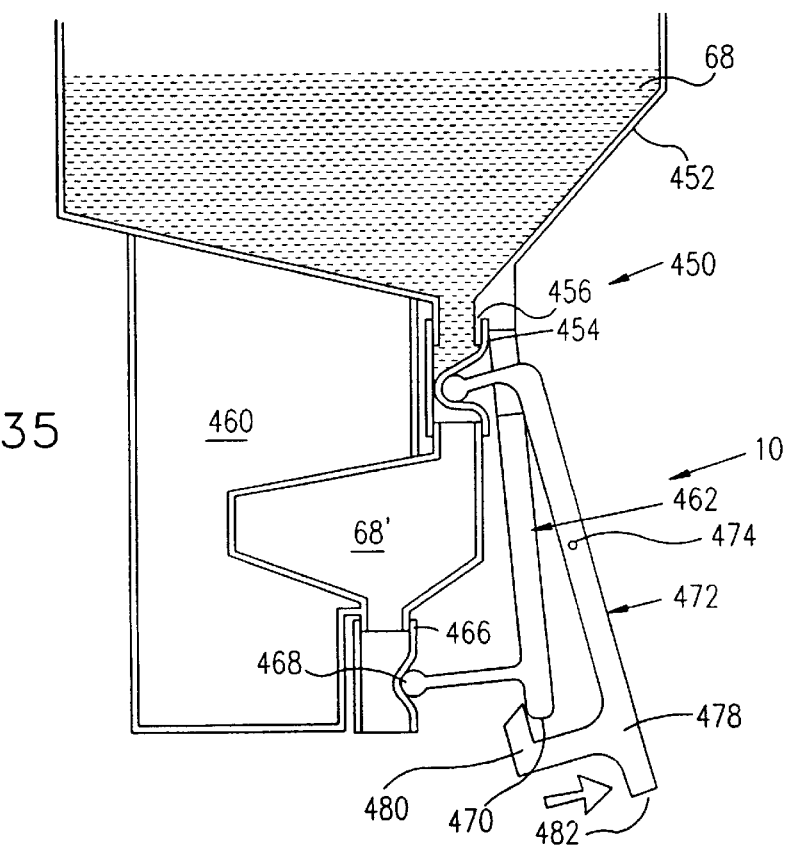
FIG. 35 is a simplified illustration of the dispenser of FIG. 33 dispensing detergent into the litter box of the present invention.

Application of a force F of a predetermined magnitude on tooth 482 in the direction of an arrow 486 pushes upper tang 476 against flexible portion 454. As seen in FIG. 35, force F causes upper tang 476 to pinch flexible portion 454, thereby sealing dispenser portion 458 from reservoir 452. The force F also pushes tooth 480 against tang 470 of valve element 462, thereby opening flexible portion 466 and allowing the detergent 68' to be emptied from dispenser portion 458 into litter box 10. The force F may be applied in a number of ways such as those described hereinabove with reference to FIGS. 26–29. It is appreciated that the geometry of upper tang 476 and tooth 480 may be varied as desired to control the timed relation of closing flexible portion 454 to the opening of flexible portion 466.

Upon release of the force F, dispenser 450 returns to the configuration shown in FIGS. 33 and 34, thereby allowing a fresh quantity of detergent 68 to flow into dispenser portion 458. Dispenser 450 is now ready for dispensing an additional portion of detergent 68'.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

What is claimed is:

1. A litter box comprising:

a housing for disposing therein litter for use by a pet;

a grinder for grinding excreta found in said litter box;

a detergent which cleanses said litter; and a dispenser for measuring out said detergent.

2. The dispenser according to claim 1 wherein said dispenser comprises apparatus for substantially preventing leaking of said substance from said dispenser before and after said detergent is dispensed into said litter box.

3. The dispenser according to claim 1 wherein said dispenser is operative to dispense a predetermined portion of said substance.

4. The dispenser according to claim 1 wherein said dispenser provides an indication that said dispenser is authorized for use.

5. The dispenser according to claim 1 wherein said dispenser provides an indication of a level of said substance in said dispenser.

6. The dispenser according to claim 1 and further comprising a reservoir for containing therein said substance.

7. The dispenser according to claim 6 and further comprising a litter box, said reservoir being attached to said litter box.

8. The dispenser according to claim 7, wherein said litter box comprises a device which controls operation of said apparatus for dispensing said substance into said litter box.

9. The dispenser according to claim 7 and further comprising apparatus for substantially preventing leaking of said substance from said reservoir when said reservoir is removed from said litter box.

10. The dispenser according to claim 7, wherein said dispenser provides an identification indication that said dispenser is installed in said litter box.

11. For use with a pet litter box, a dispenser comprising:

a substance comprising at least one of a detergent and a disinfectant;

apparatus for dispensing said substance into a litter box.

12. The dispenser according to claim 11 wherein said dispenser comprises apparatus for substantially preventing leaking of said substance from said dispenser before and after said detergent is dispensed into said litter box.

13. The dispenser according to claim 11 wherein said dispenser is operative to dispense a predetermined portion of said substance.

14. The dispenser according to claim 11 wherein said dispenser provides an indication that said dispenser is authorized for use.

15. The dispenser according to claim 11 wherein said dispenser provides an indication of a level of said substance in said dispenser.

16. The dispenser according to claim 11 and further comprising a reservoir for containing therein said substance.

17. The dispenser according to claim 16 and further comprising a litter box, said reservoir being attached to said litter box.

18. The dispenser according to claim 17 wherein said litter box comprises a device which controls operation of said apparatus for dispensing said substance into said litter box.

* * * * *